(12) United States Patent
Shima

(10) Patent No.: US 8,782,202 B2
(45) Date of Patent: Jul. 15, 2014

(54) MONITOR CONTROL OF DEVICES CONNECTED TO NETWORK

(75) Inventor: Toshihiro Shima, Suwa (JP)

(73) Assignee: Seiko Epson Corporation, Tokyo (JP)

(*) Notice: Subject to any disclaimer, the term of this patent is extended or adjusted under 35 U.S.C. 154(b) by 699 days.

(21) Appl. No.: 11/794,893

(22) PCT Filed: Jan. 10, 2006

(86) PCT No.: PCT/JP2006/300415
§ 371 (c)(1),
(2), (4) Date: Jul. 9, 2007

(87) PCT Pub. No.: WO2006/075729
PCT Pub. Date: Jul. 20, 2006

(65) Prior Publication Data
US 2008/0140787 A1    Jun. 12, 2008

(30) Foreign Application Priority Data

Jan. 13, 2005  (JP) ................................. 2005-005866
Jan. 13, 2005  (JP) ................................. 2005-005869
Feb. 23, 2005  (JP) ................................. 2005-046564

(51) Int. Cl.
*G06F 15/173* (2006.01)
(52) U.S. Cl.
USPC ............................ 709/224; 709/206; 709/223
(58) Field of Classification Search
USPC .......................................... 709/224, 206, 223
See application file for complete search history.

(56) References Cited

U.S. PATENT DOCUMENTS

| | | | |
|---|---|---|---|
| 7,056,039 B2* | 6/2006 | Mokuya et al. | 400/76 |
| 7,376,725 B2 | 5/2008 | Takahashi et al. | |
| 7,653,717 B2 | 1/2010 | Tomita | |
| 2002/0188707 A1* | 12/2002 | Terrill | 709/223 |
| 2003/0193689 A1* | 10/2003 | Nakagawa | 358/1.15 |
| 2003/0204590 A1* | 10/2003 | Torii | 709/224 |
| 2005/0018241 A1 | 1/2005 | Azami | |

FOREIGN PATENT DOCUMENTS

| | | |
|---|---|---|
| JP | 08-265317 A | 10/1996 |
| JP | 10-161952 A | 6/1998 |
| JP | 2001-338133 A | 12/2001 |
| JP | 2002-189638 A | 7/2002 |
| JP | 2003-85309 A | 3/2003 |
| JP | 2003-186765 A | 7/2003 |
| JP | 2003-186785 A | 7/2003 |

(Continued)

OTHER PUBLICATIONS

Steven D. Kaczmarek: "Microsoft Systems Management Server 2003 Administrator's Companion: Ch. 9", Jan. 21, 2004, Microsoft Press, XP002520188, pp. 1-5.

*Primary Examiner* — Glenford Madamba

(57) ABSTRACT

At an upload time, each of multiple printers connecting with a network identifies storage or non-storage of any unsent monitor information file, which has not yet been sent to a management server. In the case of storage of any unsent monitor information file, the printer collects from the other printers unsent monitor information files, which are stored in the other printers and have not yet been sent to the management server, and uploads the collected monitor information files and the unsent monitor information file stored in the self printer to the management server. This arrangement effectively reduces the access frequency from the respective printers to the management server for transmission of monitor information files from the printers to the management server.

21 Claims, 19 Drawing Sheets

(56) References Cited

FOREIGN PATENT DOCUMENTS

| | | | |
|---|---|---|---|
| JP | 2004-185351 A | 7/2004 |
| JP | 2004-214785 A | 7/2004 |
| JP | 2004-220564 A | 8/2004 |
| JP | 2004-234625 A | 8/2004 |
| JP | 2005-004251 A | 1/2005 |

\* cited by examiner

MONITOR CONTROL OF DEVICES CONNECTED TO NETWORK

TECHNICAL FIELD

The present invention relates to a monitor control technique of devices connected to a network.

BACKGROUND ART

With the spread of the network technology including the Internet and local area networks, a device management system has been proposed where a management server connecting with a network manages multiple devices, such as printers, connecting with the network (see, for example, Japanese Patent Laid-Open Gazette No. 2004-185351 and No. 2002-189638). In the prior art device management system, each device connecting with the network utilizes, for example, a network board built in the device to obtain monitor information with regard to the device, for example, an operating status of the device, and individually sends the obtained monitor information to the management server. When the device is a printer, the monitor information is, for example, the total number of prints, the total consumption of ink or toner, the remaining amount of ink or toner, or error information.

In the device management system, there may be a firewall between the management server and each device. In this case, the management server may not be allowed to request each device for transmission of monitor information and collect the monitor information from each device. In another possible arrangement, each device may send the monitor information to the management server without a request from the management server. With an increase in number of devices as the management target of the management server, a large number of devices may simultaneously make access to the management server and send the monitor information to the management server. Such simultaneous access and transmission may interfere with smooth processing and management of monitor information by the management server. This problem is commonly found in various device management systems including a management server for managing not only printers but other diverse devices connecting with a network.

The use of a high-performance management server in the device management system reduces the potential of the above problems but undesirably increases the cost. Another possible measure against the above problems without using the high-performance management server causes one device to simultaneously collect monitor information from the other devices and send the collected monitor information to the management server. This reduces the access frequency from the respective devices to the management server. The simultaneous collection of the monitor information from the other devices to one device, however, abruptly increases the network traffic. This may interfere with smooth communication in the network.

By taking into account such problems of the prior art, in a device management system where each of multiple devices sends monitor information to a management server, there is a need of reducing the access frequency from the respective devices to the management server. There is also a need of restraining an abrupt increase in network traffic by transmission of monitor information.

DISCLOSURE OF THE INVENTION

In order to satisfy at least part of the above and the other related demands, the present invention is directed to a device monitor control apparatus that is built in a device connecting with a network and sends monitor information regarding the device to a server connecting with the network.

The device monitor control apparatus includes: a monitor information storage module that stores the monitor information; a decision module that determines at a preset timing whether monitor information for transmission, which is to be sent to the server, is stored in the monitor information storage module; a monitor information collection module that, upon determination of storage of the monitor information for transmission in the monitor information storage module by the decision module, sends a transmission request to another device connecting with the network for sending monitor information for transmission, which is to be sent to the server and is stored in the another device, and collects the monitor information for transmission from the another device as a response to the transmission request; and a transmission module that sends the collected monitor information for transmission and the monitor information for transmission stored in the monitor information storage module to the server.

The device monitor control apparatus of the invention is built in a device connecting with the network in the form of, for example, a network card or a network board. The device may be any of diverse devices connecting with the network, for example, a printer, a scanner, a projector, an audio device, an electrical appliance, a client computer, or a PDA (personal digital assistant). The terminology 'preset timing' represents a timing set for transmission of monitor information to the server. This timing may hereafter be referred to as an upload time. The terminology 'monitor information for transmission, which is to be sent to the server' represents, for example, unsent monitor information that has not yet been sent to the server.

In the case of storage of the monitor information for transmission, which is to be sent to the server, in the monitor information storage module at the upload time, the device monitor control apparatus of the invention collects the monitor information for transmission, which is to be sent to the server and is stored in another device, from the another device and sends the collected monitor information for transmission together with the monitor information for transmission stored in the monitor information storage module to the server. In the case of no storage of the monitor information for transmission, which is to be sent to the server, in the monitor information storage module at the upload time, on the other hand, the device monitor control apparatus of the invention does not collect the monitor information for transmission from the another device and does not send the monitor information to the server. Namely there is an occasion of not collecting the monitor information for transmission from the another device and not sending the monitor information to the server even at the upload time. This arrangement desirably reduces the access frequency from the device monitor control apparatus or the device to the server.

In one preferable embodiment of the device monitor control apparatus of the invention, upon determination of no storage of the monitor information for transmission in the monitor information storage module by the decision module, the monitor information collection module prohibits the collection of the monitor information for transmission from the another device.

Upon determination of no storage of the monitor information for transmission, which is to be sent to the server, in the monitor information storage module at the upload time, the device monitor control apparatus of this embodiment does not collect the monitor information for transmission from the another device and does not send the monitor information to the server. This arrangement desirably reduces the access frequency from the device monitor control apparatus to the server.

In one aspect of the invention, the device monitor control apparatus further includes an event occurrence detection module that detects occurrence of a specific event in the device with the built-in device monitor control apparatus. In response to detection of the occurrence of the specific event in the device with the built-in device monitor control apparatus by the event occurrence detection module, the monitor information collection module performs the collection of the monitor information for transmission from the another device.

The specific event may be a critical event that requires an urgent notification to the server. In application of a printer for the device, the critical event is, for example, malfunction of a printer engine or failed color adjustment by a printer controller. The device monitor control apparatus of this aspect, on the occurrence of any critical event requiring an urgent notification to the server, immediately notifies the server of the occurrence of the critical event, while effectively reducing the access frequency from the device monitor control apparatus to the server.

In another aspect of the invention, the device monitor control apparatus further includes an identification information storage module that stores identification information for identifying the device with the built-in device monitor control apparatus. The monitor information collection module collects identification information for identifying the another device from the another device. The transmission module sends the collected monitor information for transmission in correlation to the identification information collected from the another device and the monitor information for transmission stored in the monitor information storage module in correlation to the identification information stored in the identification information storage module.

The identification information may be, for example, a name, an MAC address, an IP address, or a production number allocated to each device. The identification information enables the server to readily identify the device sending the monitor information.

In still another aspect of the invention, the device monitor control apparatus further includes a monitor information file creation module that creates a monitor information file that integrally records the collected monitor information for transmission and the monitor information for transmission stored in the monitor information storage module. The transmission module sends the created monitor information file to the server.

This arrangement allows simultaneous transmission of the monitor information with regard to multiple devices to the server and thus effectively controls the network traffic.

In another aspect of the invention, the device monitor control apparatus further includes: a reception complete response receiving module that receives a reception complete response, which represents completed reception of the monitor information, from the server; and a monitor information deletion module that deletes sent monitor information, which has been sent to the server and is stored in the monitor information storage module, in answer to the reception complete response.

In the device monitor control apparatus of this aspect, all the monitor information stored in the monitor information storage module is the monitor information for transmission that is to be sent to the server. The decision module can thus readily identify storage or non-storage of the monitor information for transmission, which is to be sent to the server, in the monitor information transmission module.

In the device monitor control apparatus of this aspect, the transmission module sends a deletion request for deletion of the collected monitor information to the another device as a sender of the collected monitor information, in answer to the reception complete response.

The another device deletes the collected monitor information, in response to the deletion request received from the device monitor control apparatus. All the monitor information stored in the another device is the monitor information for transmission that is to be sent to the server. The another device can thus readily identify storage or non-storage of the monitor information for transmission, which is to be sent to the server.

In still another aspect of the invention, the device monitor control apparatus further includes a transmission request receiving module that receives the transmission request from the another device. In response to the received transmission request, the transmission module sends the monitor information for transmission stored in the monitor information storage module to the another device that has sent the transmission request.

The device monitor control apparatus of this aspect sends the monitor information for transmission to the another device, in response to the transmission request received from the another device.

In one preferable embodiment of this aspect, the device monitor control apparatus further includes: a reception complete response receiving module that receives a reception complete response, which represents completed reception of the monitor information, from the another device; and a monitor information deletion module that deletes sent monitor information, which has been sent to the another device and is stored in the monitor information storage module, in answer to the reception complete response.

The device monitor control apparatus of this embodiment deletes the sent monitor information, which has been sent to the another device, in response to the reception complete response received from the another device.

In another preferable embodiment of this aspect, the device monitor control apparatus further includes: a deletion request receiving module that receives a deletion request from the another device for deletion of sent monitor information that has been sent to the another device; and a monitor information deletion module that deletes the sent monitor information that has been sent to the another device and is stored in the monitor information storage module, in response to the received deletion request.

The device monitor control apparatus of this embodiment deletes the sent monitor information, which has been sent to the another device, in response to the deletion request received from the another device.

The present invention is also directed to another device monitor control apparatus that is built in a device connecting with a network and sends monitor information regarding the device to a server connecting with the network.

The device monitor control apparatus includes: a monitor information storage module that stores the monitor information; a monitor information collection module that sends a transmission request to another device connecting with the network for sending monitor information for transmission, which is to be sent to the server and is stored in the another device, and collects the monitor information for transmission from the another device as a response to the transmission request; a transmission module that sends the collected monitor information for transmission and the monitor information for transmission stored in the monitor information storage module to the server; and a decision module that identifies requirement or non-requirement for the collection of the monitor information, based on a predetermined condition at a preset timing prior to the collection of the monitor information.

Upon identification of the non-requirement for the collection of the monitor information by the decision module, the monitor information collection module suspends the collection of the monitor information at least to a next preset timing.

When the predetermined condition for collection of the monitor information is unsatisfied at the upload time, the device monitor control apparatus of the invention does not collect the monitor information from the another device and does not send the monitor information to the server. The collection of the monitor information from the another device is suspended to a next upload time. This arrangement desirably reduces the access frequency from the device monitor control apparatus or the device to the server.

In one preferable embodiment of the device monitor control apparatus of the invention, upon identification of the non-requirement for the collection of the monitor information by the decision module, the transmission module suspends the transmission of the monitor information for transmission stored in the monitor information storage module to the server at least to the next preset timing.

This arrangement further reduces the access frequency from the device monitor control apparatus to the server.

In one aspect of the invention, the device monitor control apparatus further includes a delayed collection request receiving module that receives a delayed collection request from the another device for suspending the collection of the monitor information. The predetermined condition includes a condition that a preset time has elapsed since the reception of the delayed collection request. The decision module identifies the non-requirement for the collection of the monitor information, when the preset time has not elapsed since the reception of the delayed collection request.

The preset time may be determined arbitrarily. When the upload time is set to a periodical timing, the preset time may be identical with the period of the upload time.

When the preset time has not yet elapsed since the reception of the delayed collection request from the another device, even in the presence of any monitor information for transmission, which is to be sent to the server, in the monitor information storage module at the upload time, the device monitor control apparatus of this aspect determines that it is not the moment of collecting the monitor information from the another device and sending the monitor information to the server. The collection of the monitor information from the another device and the transmission of the monitor information to the server are thus suspended to a next upload time. This arrangement desirably reduces the access frequency from the device monitor control apparatus to the server.

In another aspect of the invention, the device monitor control apparatus further includes a transmission request receiving module that receives the transmission request from the another device. The transmission module receives the transmission request from the another device and, in response to the received transmission request, sends back the monitor information stored in the monitor information storage module to the another device that has sent the transmission request. The predetermined condition includes a condition that a preset time has elapsed since the transmission of the monitor information. The decision module identifies the non-requirement for the collection of the monitor information, when the preset time has not elapsed since the transmission of the monitor information.

When the preset time has not yet elapsed since the previous transmission of the monitor information, even in the presence of any monitor information for transmission, which is to be sent to the server, in the monitor information storage module at the upload time, the device monitor control apparatus of this aspect determines that it is not the moment of collecting the monitor information from the another device and sending the monitor information to the server. The collection of the monitor information from the another device and the transmission of the monitor information to the server are thus suspended to a next upload time. This arrangement also desirably reduces the access frequency from the device monitor control apparatus to the server.

In one preferable embodiment of this aspect, the device monitor control apparatus further includes a reception complete response receiving module that receives a reception complete response, which represents completed reception of the monitor information, from either the server or the another device. The predetermined condition includes a condition that a preset time has elapsed since the reception of the reception complete response. The decision module identifies the non-requirement for the collection of the monitor information, when the preset time has not elapsed since the reception of the reception complete response.

When the preset time has not yet elapsed since the previous transmission of the monitor information and the subsequent reception of the reception complete response, even in the presence of any monitor information for transmission, which is to be sent to the server, in the monitor information storage module at the upload time, the device monitor control apparatus of this aspect determines that it is not the moment of collecting the monitor information from the another device and sending the monitor information to the server. The collection of the monitor information from the another device and the transmission of the monitor information to the server are thus, suspended to a next upload time. This arrangement also desirably reduces the access frequency from the device monitor control apparatus to the server.

In another preferable embodiment of this aspect, the device monitor control apparatus further includes: a deletion request receiving module that receives a deletion request from either the server or the another device for deletion of sent monitor information stored in the monitor information storage module; and a monitor information deletion module that deletes the sent monitor information, in response to the received deletion request. The predetermined condition includes a condition that a preset time has elapsed since the deletion of the sent monitor information. The decision module identifies the non-requirement for the collection of the monitor information, when the preset time has not elapsed since the deletion of the sent monitor information.

When the preset time has not yet elapsed since the previous transmission of the monitor information and the subsequent reception of the deletion request for deletion of the sent monitor information, even in the presence of any monitor information for transmission, which is to be sent to the server, in the monitor information storage module at the upload time, the device monitor control apparatus of this aspect determines that it is not the moment of collecting the monitor information from the another device and sending the monitor information to the server. The collection of the monitor information from the another device and the transmission of the monitor information to the server are thus suspended to a next upload time.

This arrangement also desirably reduces the access frequency from the device monitor control apparatus to the server.

In another preferable embodiment of the device monitor control apparatus of the invention, the monitor information storage module stores the monitor information in correlation to timing information, which represents a storage timing of the monitor information. The predetermined condition includes a condition that the monitor information storage module has monitor information for transmission, which was stored at least a preset time before and is to be sent to the server. The decision module refers to the timing information and identifies the non-requirement for the collection of the monitor information, when the monitor information storage module does not have any monitor information for transmission, which was stored at least the preset time before and is to be sent to the server.

When the monitor information storage module has no monitor information for transmission stored at least the preset time before, even in the presence of any monitor information for transmission, which is to be sent to the server, in the monitor information storage module at the upload time, the device monitor control apparatus of this aspect determines that it is not the moment of collecting the monitor information from the another device and sending the monitor information to the server. The collection of the monitor information from the another device and the transmission of the monitor information to the server are thus suspended to a next upload time. This arrangement also desirably reduces the access frequency from the device monitor control apparatus to the server.

In the device monitor control apparatus having any of the above arrangements, the predetermined condition may include a condition that the monitor information storage module has any monitor information for transmission. The decision module may identify the non-requirement for the collection of the monitor information, when the monitor information storage module has no monitor information for transmission.

This arrangement increases the condition for collection of the monitor information and thereby further reduces the access frequency from the device monitor control apparatus to the server.

The technique of the invention is also attainable by application of a device.

The device of the invention is connected with a network and includes the device monitor control apparatus having any of the above arrangements.

The device of the invention desirably reduces the access frequency from the device to the server, like the device monitor control apparatus described above.

The technique of the invention is also attainable by application of a device management system.

The present invention is thus directed to a device management system including a first device, a second device, and a server that are mutually connected via a network.

The first device has a monitor information storage module that stores monitor information regarding the first device. The first device determines at a preset timing whether monitor information for transmission, which is to be sent to the server, is stored in the monitor information storage module, and upon determination of storage of the monitor information for transmission in the monitor information storage module, sends a transmission request to the second device for sending monitor information for transmission, which is to be sent to the server and is stored in the second device. The second device receives the transmission request and sends back the monitor information for transmission stored in the second device to the first device in response to the received transmission request. The first device receives the monitor information for transmission from the second device and sends the monitor information for transmission received from the second device and the monitor information for transmission stored in the monitor information storage module to the server.

In the device management system of the invention, both the first device and the second device have the built-in device monitor control apparatus of the invention described above. When the monitor information storage module of one device (the first device) has storage of the monitor information for transmission, which is to be sent to the server, at the upload time, the one device collects the monitor information from the another device (the second device). This lowers the probability of storage of monitor information for transmission, which is to be sent to the server, in the monitor information storage module of the another device at the upload time. When the monitor information for transmission that is to be sent to the server has already been collected by the one device and is thus not stored in the monitor information storage module of the another device at the upload time, the another device does not collect the monitor information and does not send the monitor information to the server. This arrangement effectively reduces the access frequency from the multiple devices to the server. In the device management system of the invention, the first device that collects the monitor information from the second device and sends the collected monitor information to the server is not fixed but is changed over. Namely any device may function as the first device that collects the monitor information from the second device and sends the collected monitor information to the server. This arrangement ensures transmission of the monitor information stored in the working device to the server.

The present invention is also directed to another device management system including a first device, a second device, and a server that are mutually connected via a network.

The first device sends a transmission request to the second device for sending monitor information stored in the second device. The second device receives the transmission request and sends back the monitor information stored in the second device to the first device in response to the received transmission request. The first device receives the monitor information from the second device and sends the monitor information received from the second device and monitor information stored in the first device to the server. On completion of reception of the monitor information from the first device, the server sends a reception complete response, which represents completed reception of the monitor information, to the first device. The first device receives the reception complete response and sends a delayed collection request to the second device for suspending collection of the monitor information. The second device determines at a preset timing whether a preset time has elapsed since reception of the delayed collection request. Upon determination that the preset time has elapsed since the reception of the delayed collection request, the second device sends a transmission request to the first device for sending the monitor information stored in the first device. Upon determination that the preset time has not yet elapsed since the reception of the delayed collection request, the second device suspends transmission of the transmission request at least to a next preset timing.

This arrangement desirably reduces the access frequency from the second device to the server.

The present invention is further directed to another device management system including multiple devices and a management server for management of the multiple devices, which are mutually connected via a network.

A specific device among the multiple devices sends a notification to another device other than the specific device to notify that the specific device collectively sends monitor information with regard to the multiple devices to the management server. The another device receives the notification and successively sends monitor information with regard to the another device to the specific device at a preset timing irrelevant to the specific device. The specific device sends monitor information with regard to the specific device and the monitor information with regard to the another device received from the another device to the management server at a specified timing.

In the device management system of the invention, after reception of the notification that the specific device collectively sends the monitor information with regard to the multiple devices to the management server, the another device successively sends the monitor information to the specific device at the preset timing irrelevant to the specific device. The 'preset timing irrelevant to the specific device' represents a timing free from the influence from the specific device or a timing determined by the another device alone. In the device management system including a large number of devices, this arrangement prevents simultaneous transmission of monitor information from the large number of devices to the specific device. This arrangement thus restrains an abrupt increase in network traffic by transmission of the monitor information to the specific device.

The specific device collectively sends the monitor information with regard to the specific device and the monitor information with regard to the another device to the management server at the specified timing. The 'specified timing' represents a timing set for transmission of the monitor information to the management server. This arrangement prevents the multiple devices from individually making access to the management server and thus desirably reduces the access frequency from the respective devices to the management server.

In the device management system where each of the multiple devices sends the monitor information to the management server, this arrangement of the invention desirably reduces the access frequency from the respective devices to the management server, while restraining an abrupt increase in network traffic by transmission of the monitor information.

In the device management system of the invention, the 'specific device' is not fixed, but each of the multiple devices occasionally functions as the 'specific device' or as the 'another device'.

In the device management system of the invention, the preset timing may be any of various timings. When each device generates monitor information with regard to the device in response to occurrence of an event in the device, the preset timing may be based on occurrence of an event in the another device.

On the occurrence of each event, the another device successively sends monitor information to the specific device. The 'preset timing' may be a timing when a predetermined number of pieces of monitor information are generated and accumulated in the another device.

In one aspect of the device management system of the invention, the multiple devices have identification information respectively allocated for identification of the multiple devices. The another device sends the monitor information with regard to the another device in correlation to identification information for identifying the another device to the specific device. The specific device sends each monitor information in correlation to identification information corresponding to the each monitor information to the management server.

The identification information may be, for example, a name, an MAC address, an IP address, or a production number allocated to each device. The identification information enables the management server to readily identify the device sending the monitor information.

In another aspect of the device management system of the invention, after transmission of the monitor information with regard to the multiple devices to the management server, the specific device sends a deletion request to the another device for deleting the sent monitor information with regard to the another device. The another device receives the deletion request from the specific device and deletes the sent monitor information with regard to the another device in response to the received deletion request.

All the monitor information stored in the another device is unsent monitor information that has not yet been sent to the management server. When functioning as the 'specific device, the another device can readily identify storage or non-storage of any unsent monitor information that has not yet been sent to the management server.

The technique of the invention is also attainable by application of a device.

The present invention is thus directed to a device used for a device management system that includes multiple devices and a management server for management of the multiple devices, which are mutually connected via a network.

The device includes: a receiving module that receives a notification from a specific device among the multiple devices to be notified that the specific device collectively sends monitor information with regard to the multiple devices to the management server; a monitor information generation module that generates monitor information with regard to the device in response to occurrence of an event in the device; and a transmission module that sends the generated monitor information to the specific device at a timing based on the occurrence of the event.

In the device management system including a large number of devices, this arrangement prevents simultaneous transmission of monitor information from the large number of devices to the specific device. This arrangement thus restrains an abrupt increase in network traffic by transmission of the monitor information to the specific device.

In one aspect of the device of the invention, the transmission module sends identification information for identifying the device in correlation to the monitor information to the specific device.

The identification information may be, for example, a name, an MAC address, an IP address, or a production number allocated to each device.

In one preferable embodiment of the invention, the device further has: a monitor information storage module that stores the generated monitor information; a deletion request receiving module that receives a deletion request from the specific device for deletion of monitor information sent to the management server; and a monitor information deletion module that deletes the monitor information that has been sent to the specific device and is stored in the monitor information storage module.

The device of this embodiment receives the deletion request from the specific device and deletes the sent monitor information that has already been sent from the specific device to the management server.

All the various characteristics described above are not essential for application of the present invention, but part of such characteristics may be omitted or may be combined with another part of the characteristics. The technique of the invention is not restricted to the device monitor control apparatuses, the devices, or the device management systems described above, but may also be actualized by control methods of such device monitor control apparatuses, and control methods of such devices, and control methods of such device management systems. The present invention is attainable by diversity of other applications. The possible applications of the invention include computer programs that are executed to actualize the control methods of the device monitor control apparatuses, the devices, and the device management systems, recording media that record such computer programs therein, and data signals that include such computer programs and are embodied in carrier waves. Any of the various additional arrangements described above may be adopted in any of these applications.

In the applications of the invention as the computer programs and the recording media in which the computer programs are recorded, the invention may be given as a whole program for actualizing the control method of the device monitor control apparatus or the control method of the device management system or for controlling the operations of devices or as a partial program for exerting only the characteristic functions of the invention. Available examples of the recording media include flexible disks, CD-ROMs, DVD-ROMs, magneto-optical disks, IC cards, ROM cartridges, punched cards, prints with barcodes or other codes printed thereon, internal storage devices (memories like RAMs and ROMs) and external storage devices of the computer, and diversity of other computer readable media.

BEST MODES OF CARRYING OUT THE INVENTION

Figure 1:
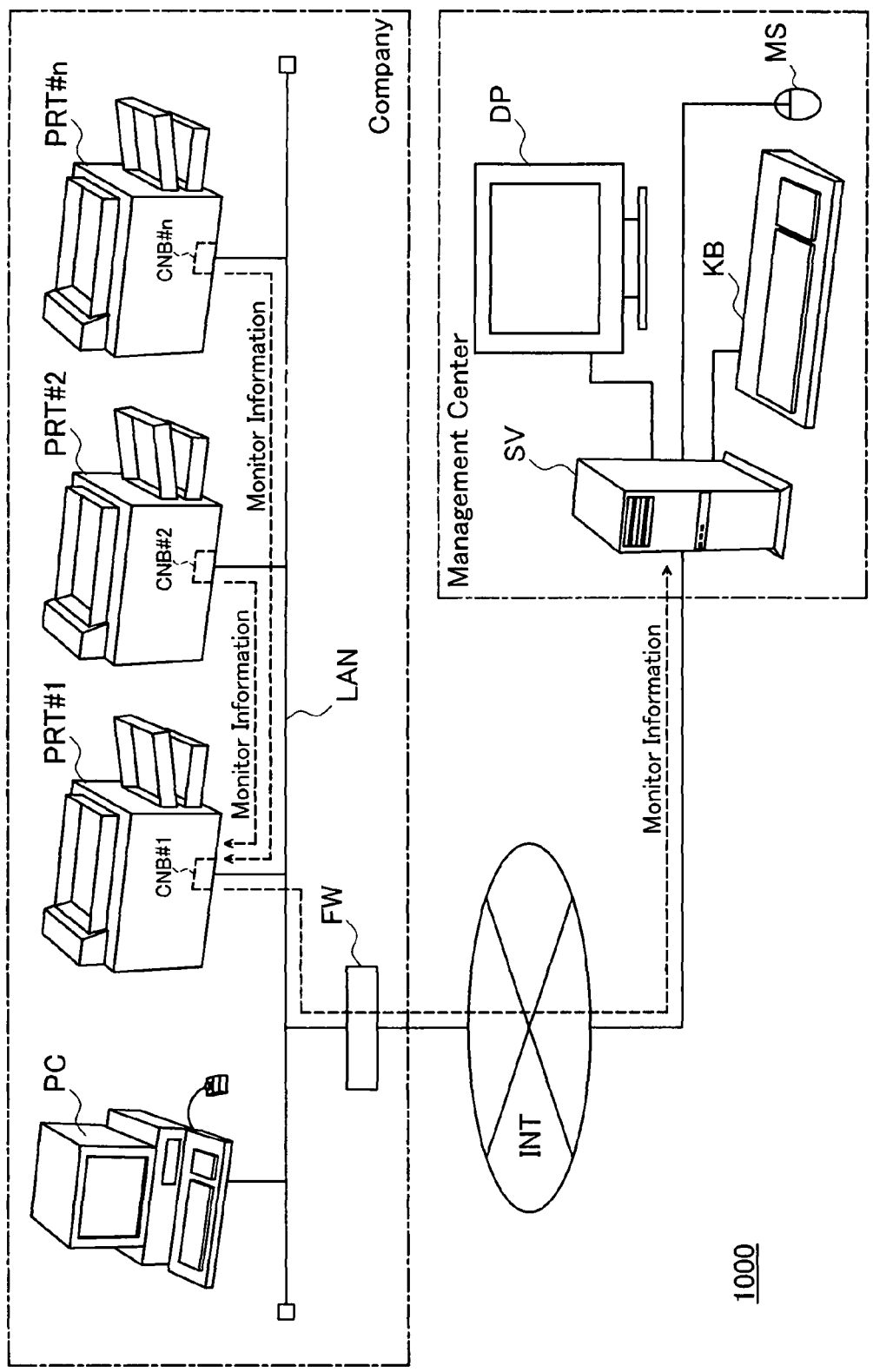
FIG. 1 schematically illustrates the configuration of a device management system 1000 in a first embodiment of the invention.

Some modes of carrying out the invention are described below in the following sequence as preferred embodiments with reference to the accompanied drawings:
A. First Embodiment
  A1. Configuration of Device Management System
  A2. Structure of Printer
  A3. Printer General Operation Flow
  A4. FTP Command Process
  A5. Upload Process
B. Second Embodiment
C. Third Embodiment
D. Fourth Embodiment
E. Fifth Embodiment
  E1. Structure of Printer
  E2. Printer General Operation Flow
  E3. File Collection Process
  E4. Upload Process
F. Second Embodiment
G. Third Embodiment
H. Fourth Embodiment
I. Modifications
A. First Embodiment
A1. Configuration of Device Management System FIG. 1 schematically illustrates the configuration of a device management system 1000 in a first embodiment of the invention. The device management system 1000 includes a management server SV in a management center and an intra-company local area network LAN that is connected to the management server SV via the Internet INT. There is a firewall FW provided between the local area network LAN and the Internet INT to prohibit accesses from the Internet INT to the local area network LAN. In the illustrated example of FIG. 1, there is only one local area network LAN connected to the management server SV. This number is, however, not restrictive and the number of local area networks connected to the management server SV may be set arbitrarily.

A personal computer PC and multiple printers PRT#1 through PRT#n are connected to the intra-company local area network LAN (hereafter the terminology 'printer PRT' may be used to collectively represent the printers PRT#1 through PRT#n). In the illustrated example of FIG. 1, there is only one personal computer PC connected to the intra-company LAN. This number is, however, not restrictive and the number of personal computers connected to the intra-company LAN may be set arbitrarily.

A word-processing software program and other application programs as well as printer drivers for controlling the operations of the printers PRT are installed in the personal computer PC. A print job output from the personal computer PC is transferred for printing to one of the printers PRT specified by the personal computer PC.

The printers PRT#1 through PRT#n respectively have built-in custom network boards CNB#1 through CNB#n (hereafter the terminology 'custom network board CNB' may be used to collectively represent the custom network boards CNB#1 through CNB#n). The custom network board CNB is a network interface for transmission of print jobs and various data including monitor information (described later) via the local area network LAN and the Internet INT. The custom network board CNB also has the functions of monitoring the operations of the corresponding printer PRT with regard to each print job and notifying the management server SV of monitor information as the monitoring result. The monitor information includes diversity of log data, for example, the number of printed copies, the amount of consumed toner, and error information. The custom network board CNB is equivalent to the device monitor control apparatus of the invention.

The management server SV in the management center stores the monitor information received from the built-in custom network boards CNB of the printers PRT into a database (not shown). The management server SV is connected to a display DP, a mouse MS, and a keyboard KB. The system manager operates these peripheral devices to browse the monitor information stored in the database and perform various settings for management of the respective printers PRT.

The following describes the general operations of the device management system 1000 of the embodiment. An upload time for transmission (upload) of the monitor information of each printer PRT to the management server SV is set in its built-in custom network board CNB. In this embodiment, different upload times are set in the respective custom network boards CNB. A waiting time for a first upload time since the power supply of each printer PRT and a periodical uploading cycle are set in the printer PRT. The upload is repeated periodically. The upload time may be set in advance in each printer PRT or may be set manually by the user. The upload time may otherwise be set automatically with random digits or may be specified by and downloaded from the management server SV.

When the upload time comes in a certain printer PRT, the certain printer PRT identifies requirement or non-requirement for upload of the monitor information to the management server SV. Upon requirement for the upload, the certain printer PRT sends a transmission request to the other printers PRT for transmission of the monitor information stored in the other printers PRT. The certain printer PRT collects the monitor information sent back from the other printers PRT as the responses to the transmission request and uploads the monitor information stored in the certain printer PRT and the collected monitor information to the management server SV. In the device management system 1000 of this embodiment, the printer PRT for collecting the monitor information from the other printers PRT and uploading the collected monitor information to the management server SV is not fixed but is changed over according to the operating statuses of the respective printers PRT. In the description hereafter, the printer PRT that collects the monitor information from the other printers PRT and uploads the collected monitor information to the management server SV is referred to as the representative printer. Each printer PRT that sends back the monitor information to the representative printer in response to the transmission request is referred to as the 'represented printer'. In the illustrated example, the broken arrows show the flows of the monitor information when the printer PRT#1 functions as the representative printer. The details of these operations will be described later.

B1. Structure of Printer

Figure 2:
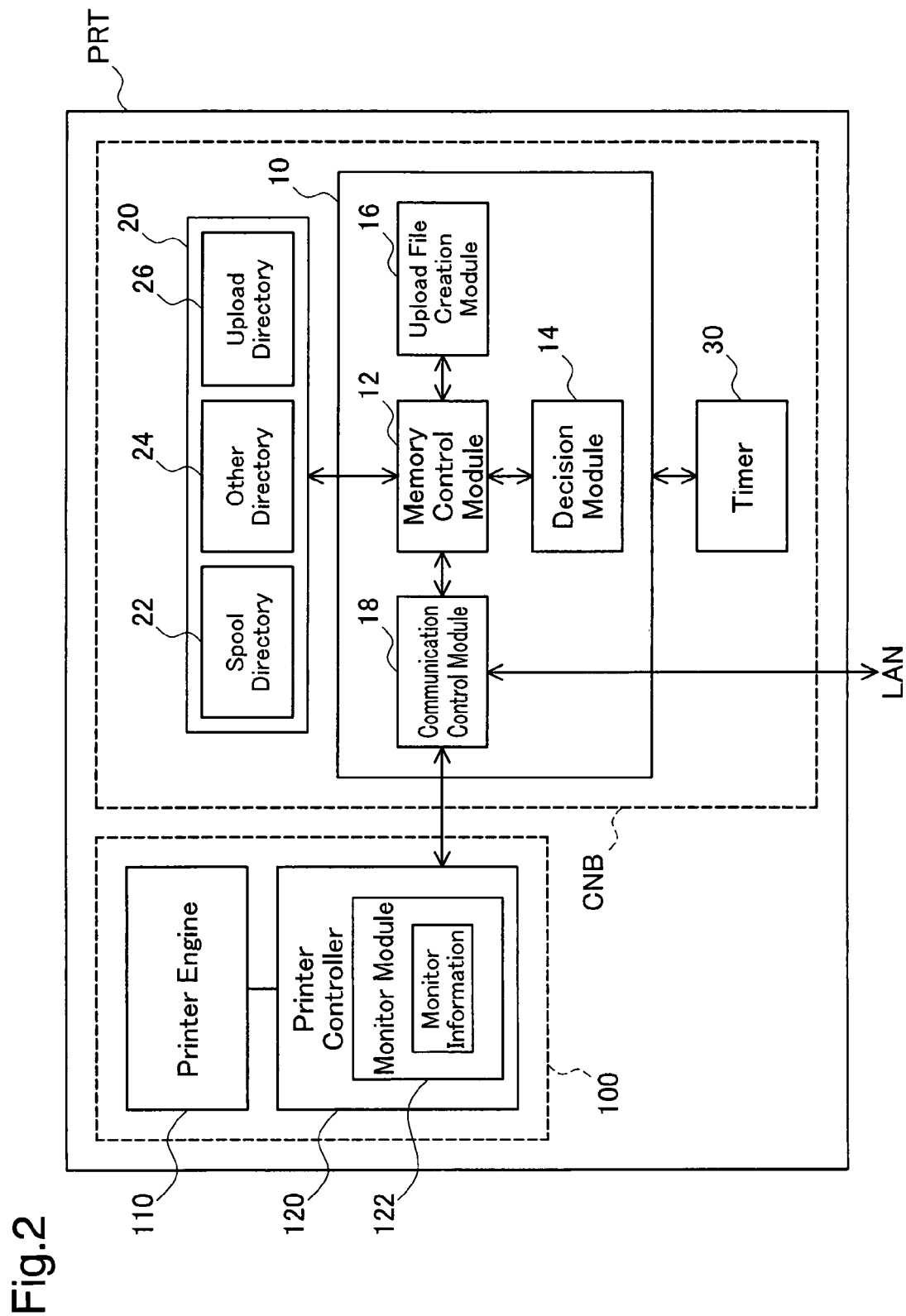
FIG. 2 shows the structure of a printer PRT.

FIG. 2 shows the structure of the printer PRT. The printer PRT includes a printer main body 100 that performs actual printing operations and a custom network board CNB. The printer main body 100 has a printer engine 110 and a printer controller 120.

The printer controller 120 is a computer including a CPU, a RAM, and a ROM (not shown). The printer controller 120 receives a print job from the personal computer PC via the custom network bard CNB and controls the printer engine 110 to perform a printing operation. The printer controller 120 has a monitor module 122 to collect various pieces of monitor information regarding the printer main body 100 and store the collected pieces of monitor information in the format of an MIB (management information base). The MIB includes general pieces of information commonly defined by the standard and specific pieces of information uniquely defined by the manufacturer.

The custom network board CNB has a CPU 10, a memory 20, and a timer 30. The memory 20 includes both a volatile memory and a nonvolatile memory. The CPU 10 includes a memory control module 12, a decision module 14, an upload file creation module 16, and a communication control module 18. The CPU 10 reads and executes preset computer programs stored in a ROM (not shown) to attain these functional blocks by the software. At least part of these functional blocks may alternatively be actualized by the hardware elements.

The memory control module 12 controls operations of writing, reading, and deleting various data into and from the memory 20. As described later in detail, the data stored in the memory 20 include monitor information files recording the self monitor information obtained from the corresponding printer controller 120, monitor information files collected from the other printers PRT, and an upload file to be sent to the management server SV. The memory 20 and the memory control module 12 are equivalent to the monitor information storage module, the identification information storage module, and the monitor information deletion module of the invention.

The decision module 14 makes decisions with regard to a printer general operation flow, an FTP command process, and an upload process described later. The decision module 14 is equivalent to the decision module and the event occurrence detection module of the invention.

The upload file creation module 16 combines the monitor information files stored in a spool directory 22 set in the memory 20 with the monitor information files stored in an 'other' directory 24 set in the memory 20 and creates an upload file to be sent to the management server SV. The upload file creation module 16 is equivalent to the monitor information file creation module of the invention.

The communication control module 18 changes over an effective communication protocol corresponding to each communication partner and establishes communication with the personal computer PC, the other printers PRT, and the management server SV via the local area network LAN and the Internet INT. The communication control module 18 sends and receives data to and from the printer controller 120. The communication control module 18 is equivalent to the monitor information collection module, the transmission module, the reception complete response receiving module, the transmission request receiving module, the deletion request receiving module, and the delayed collection request receiving module of the invention.

The timer 30 counts the time elapsed since the power supply of the printer PRT. In the structure of this embodiment, the timer 30 counts the frequency of power supply, as well as the time elapsed since each power-on operation of the printer PRT.

The memory 20 includes the spool directory 22, the 'other' directory 24, and an upload directory 26. The spool directory 22 stores monitor information files recording the self monitor information received from the corresponding printer controller 120. The 'other' directory 24 stores monitor information files collected from the other printers PRT. The upload directory 26 stores an upload file created by the upload file creation module 16. The upload file is to be uploaded to the management server SV.

Figure 3:
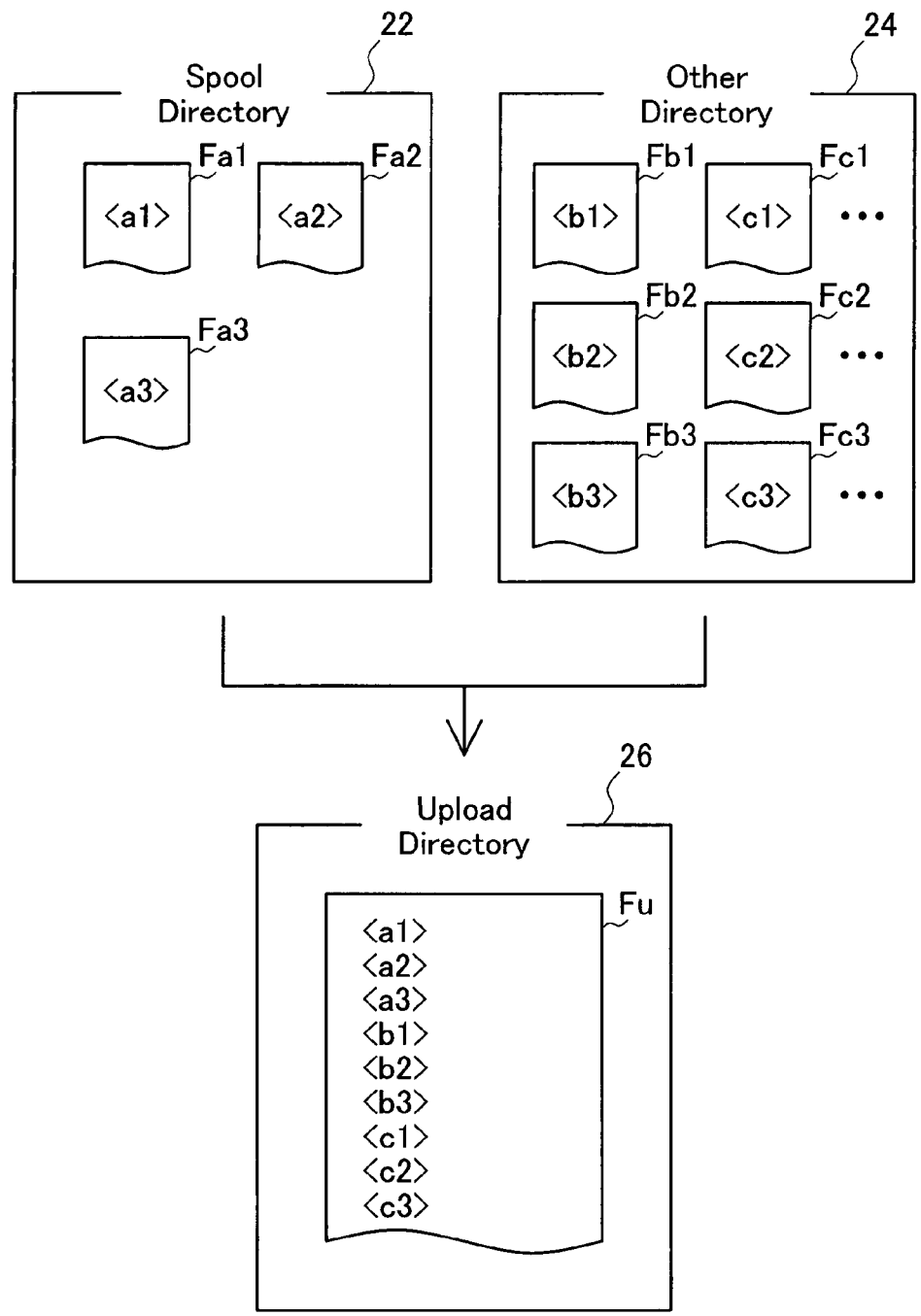
FIG. 3 shows creation of an upload file.

FIG. 3 shows creation of the upload file. In the illustrated example, the spool directory 22 stores monitor information files Fa1, Fa2, and Fa3, and the 'other' directory 24 stores collected monitor information files, for example, Fb1, Fb2, Fb3, Fc1, Fc2, Fc3. Each monitor information file stores identification information of the relevant printer PRT, as well as monitor information. The identification information may be, for example, a name, an MAC address, an IP address, or a production number allocated to each printer PRT. Each monitor information file also stores the time when the monitor information file was created and stored into the memory 20.

In the illustrated example, the upload file creation module 16 combines the monitor information files Fa1, Fa2, Fa3 with the monitor information files Fb1, Fb2, Fb3, Fc1, Fc2, Fc3, . . . , creates an upload file Fu, and stores the created upload file Fu into the upload directory 26. Creation of this upload file enables simultaneous transmission of the monitor information regarding the multiple printers PRT to the management server SV and thereby controls the network traffic. Each monitor information file includes the identification information of the relevant printer PRT. The management server SV analyzes the contents of the received upload file Fu and readily identifies the printer PRT outputting each monitor information file.

A2. Printer General Operation Flow

Figure 4:
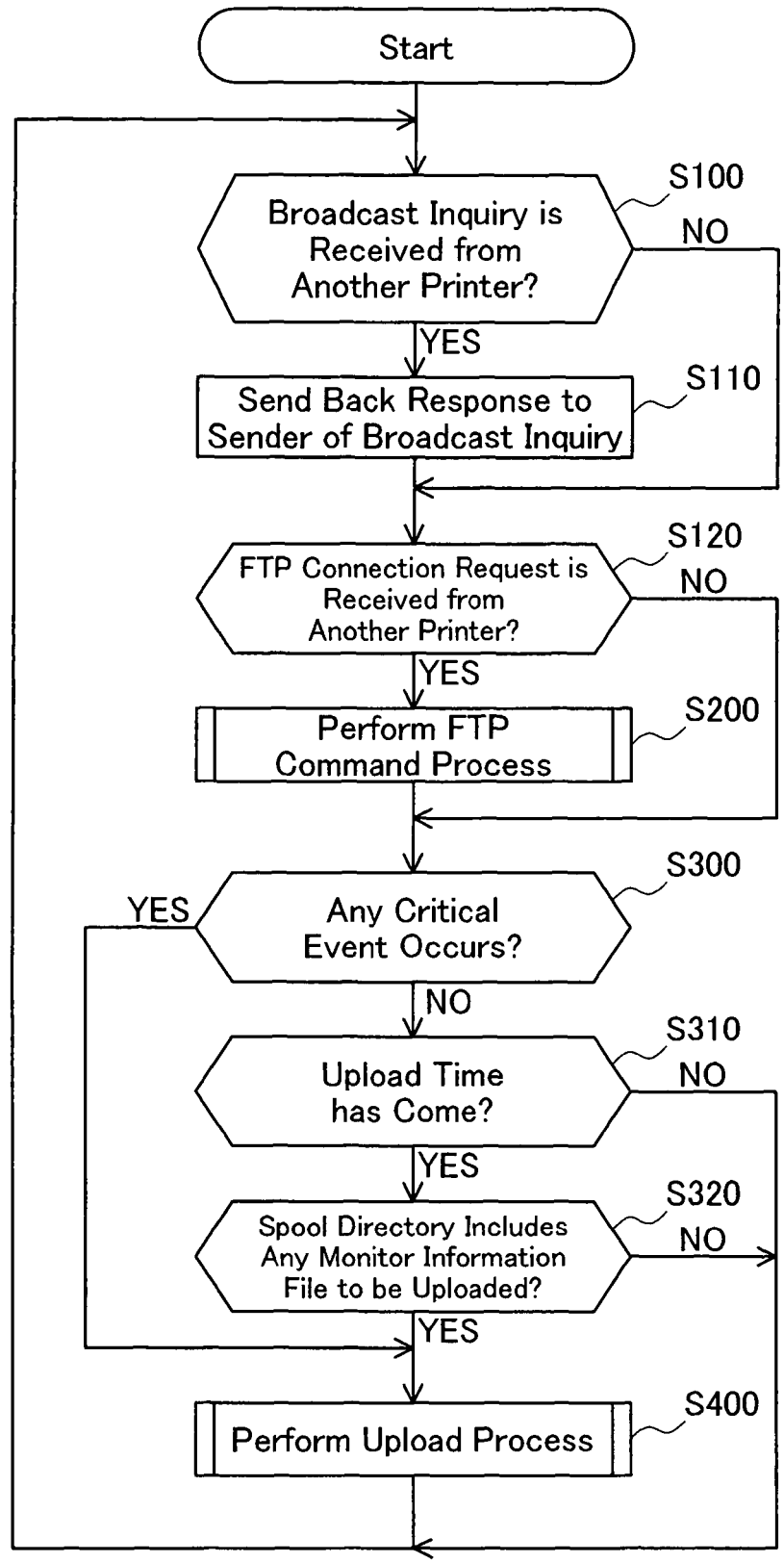
FIG. 4 is a flowchart showing a general operation flow of the printer PRT.

FIG. 4 is a flowchart showing a general operation flow of the printer PRT. The general operation flow starts in response to a power-on operation and is continually performed until a power-off operation by the CPU 10 of the custom network board CNB in each printer PRT.

The CPU 10 first determines whether a broadcast inquiry for confirmation of the presence is received from another printer or the representative printer (step S100). In response to reception of the broadcast inquiry (step S100: yes), the CPU 10 specifies the self printer PRT as a represented printer and sends a response representing the confirmed presence to the representative printer as the sender of the broadcast inquiry (step S110). In the case of no reception of the broadcast inquiry from the representative printer (step S100: no), on the other hand, the general operation flow goes to step S120.

The CPU 10 subsequently determines whether an FTP connection request is received from another printer or the representative printer (step S120). In response to reception of the FTP connection request from the representative printer (step S120: yes), the CPU 10 executes an FTP command process according to a received FTP command (step S200). On completion of the FTP command process, the role of the printer PRT as the represented printer is completed. The FTP command process will be described later in detail. In the case of no reception of the FTP connection request from the representative printer (step S120: no), on the other hand, the general operation flow goes to step S300.

The CPU 10 then determines whether any critical event occurs in the printer main body 100 (step S300). The critical event requires an urgent notification to the management server SV and is, for example, malfunction of the printer engine 110 or failed color adjustment by the printer controller 120. This determination is based on the contents of the monitor information files stored in the spool directory 22. In the occurrence of some critical event in the printer main body 100 (step S300: yes), the CPU 10 specifies the self printer PRT as the representative printer and performs an upload process (step S400). On the occurrence of any critical event requiring the urgent notification to the management server SV, the printer PRT can immediately notify the management server SV of the occurrence of the critical event. The details of the upload process will be described later. On completion of the upload process, the role of the self printer PRT as the representative printer is completed, and the general operation flow returns to step S100.

On no occurrence of any critical event in the printer main body 100 (step S300: no), the CPU 10 refers to the timer 30 and determines whether the upload time has come (step S310). When the upload time has not yet come (step S310: no), the general operation flow returns to step S100. When the upload time has come (step S310: yes), on the other hand, the CPU 10 determines whether the spool directory 22 stores any monitor information file to be uploaded to the management server SV (step S320). When the spool directory 22 includes any monitor information file to be uploaded to the management server SV (step S320: yes), the CPU 10 specifies the self printer PRT as the representative printer and performs the upload process (step S400). On completion of the upload process, the role of the self printer PRT as the representative printer is completed, and the general operation flow returns to step S100. When the spool directory 22 includes no monitor information file to be uploaded to the management server SV (step S320: no), on the other hand, the general operation flow returns to step S100 without specifying the self printer PRT as the representative printer and performing the upload process.

A3. FTP Command Process

Figure 5:
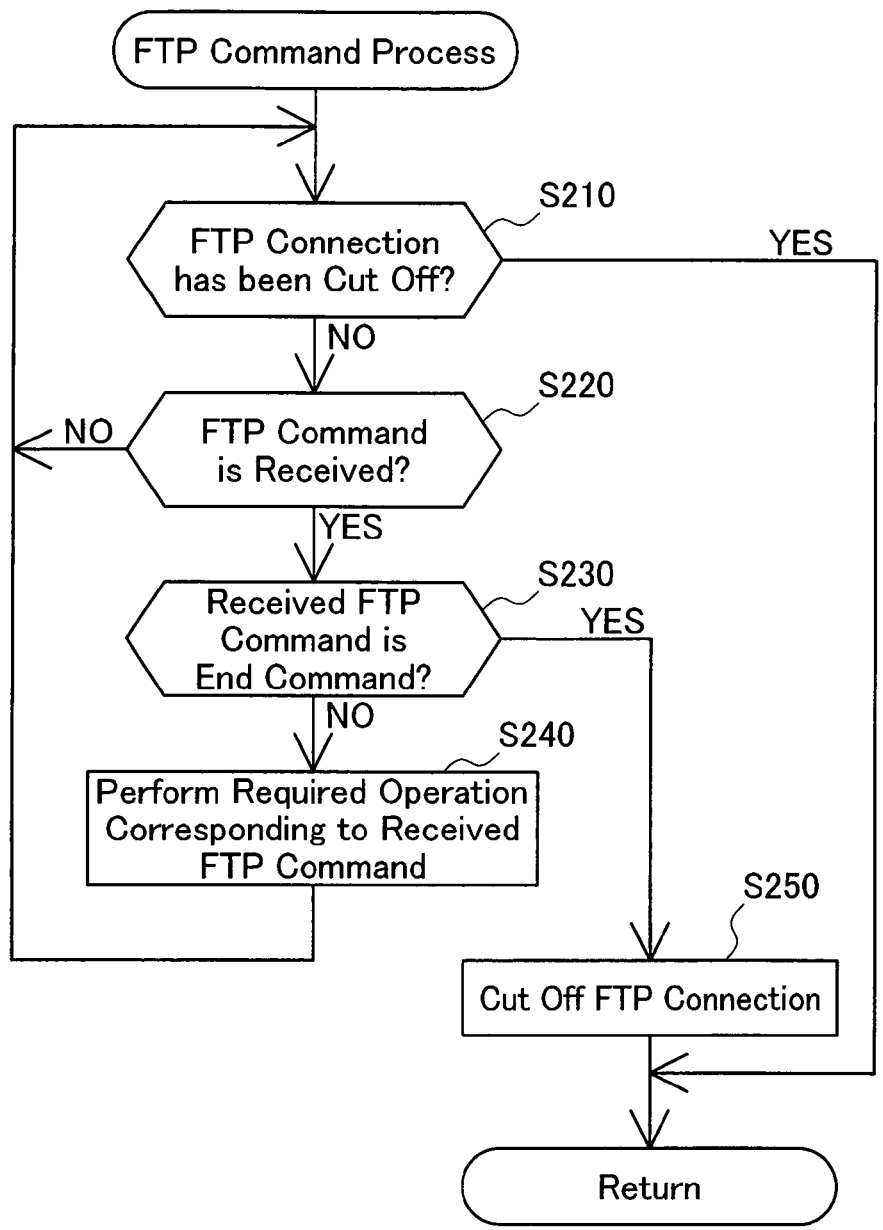
FIG. 5 is a flowchart showing the details of an FTP command process.

FIG. 5 is a flowchart showing the details of the FTP command process executed at step S200 in the general operation flow of FIG. 4. The FTP command process is performed by the CPU 10 of the represented printer.

The CPU 10 of the represented printer first determines whether an FTP connection with the representative printer has been cut off (step S210). In the event of cutoff of the FTP connection (step S210: yes), the FTP command process is immediately terminated without any further processing.

In the case of no cutoff of the FTP connection (step S210: no), the CPU 10 subsequently determines whether an FTP command is received from the representative printer (step S220). In the case of no reception of the FTP command from the representative printer (step S220: no), the CPU 10 waits until reception of the FTP command.

In response to reception of the FTP command from the representative printer (step S220: yes), the CPU 10 identifies whether the received FTP command is an end command (step S230). When the FTP command received from the representative printer is not the end command (step S230: no), the CPU 10 performs a required operation corresponding to the received FTP command (step S240). The required operation is, for example, transfer of monitor information files or deletion of monitor information files as described later in detail. On completion of the required operation, the FTP command process goes back to step S210. When the FTP command received from the representative printer is the end command (step S230: yes), on the other hand, the CPU 10 cuts off the FTP connection with the representative printer (step S250) and exits from the FTP command process. The role of the represented printer is completed at this moment.

A4. Upload Process

Figure 6:
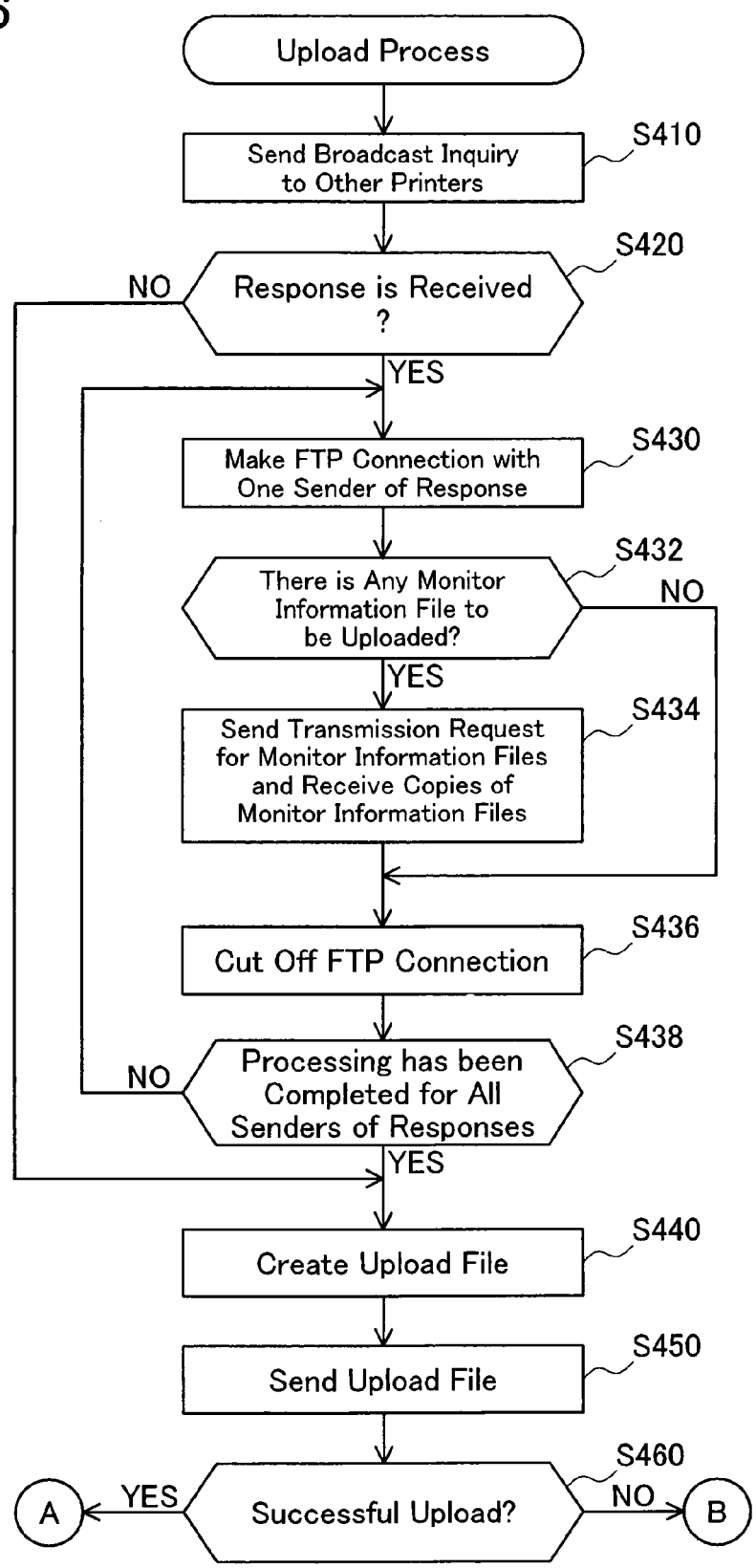
FIG. 6 is a flowchart showing the details of an upload process.
Figure 7:
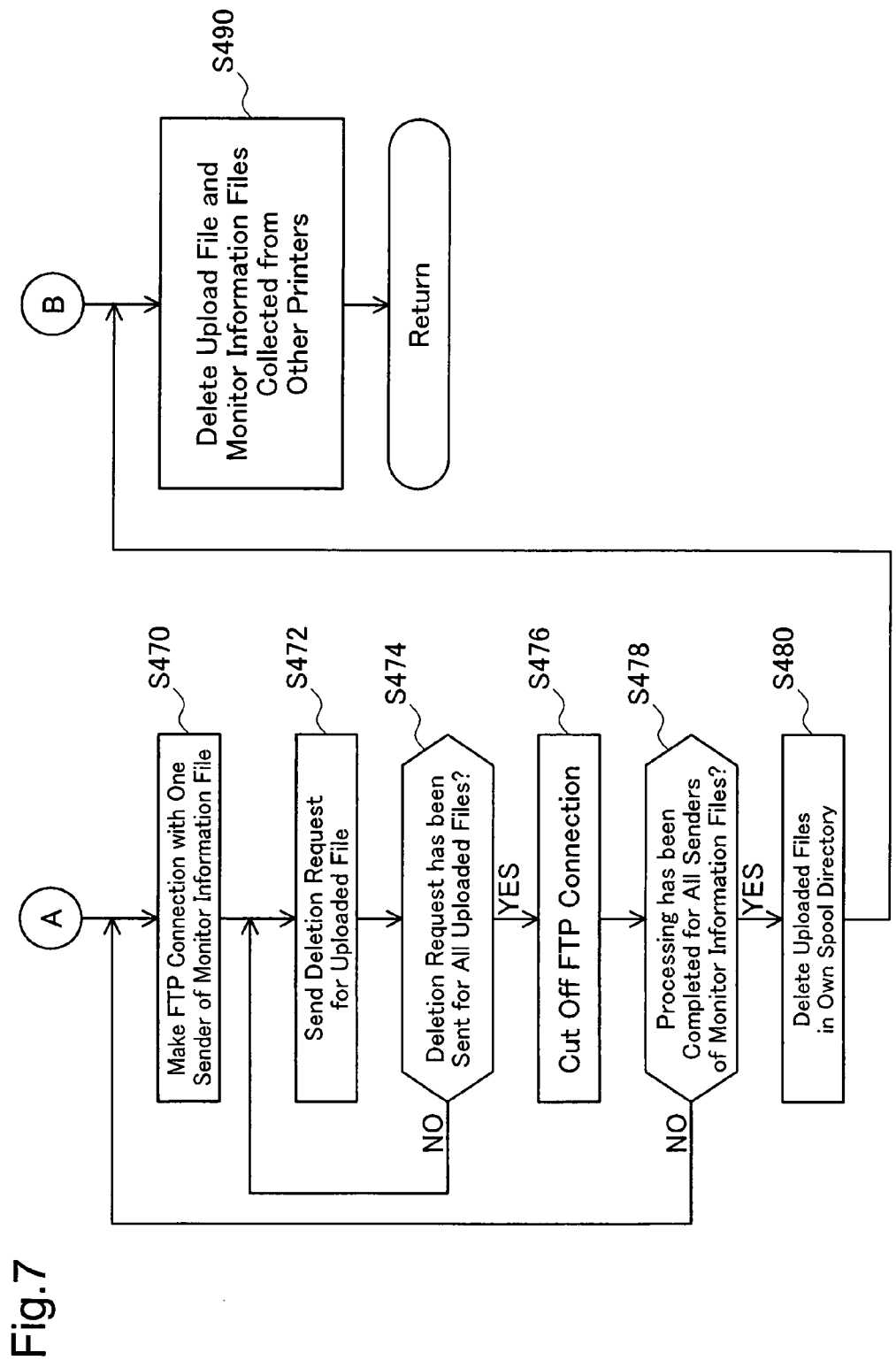
FIG. 7 is a flowchart showing the details of the upload process.

FIGS. 6 and 7 are flowcharts showing the details of the upload process executed at step S400 in the general operation flow of FIG. 4. The upload process is performed by the CPU 10 of the representative printer.

The CPU 10 of the representative printer sends a broadcast inquiry for confirmation of the presence to all the other printers PRT, that is, all the represented printers connected to the local area network LAN (step S410). The CPU 10 then determines whether a response to the broadcast inquiry is received from any of the represented printers (step S420). In the case of no reception of any response to the broadcast inquiry from any of the represented printers (step S420: no), the CPU 10 identifies the absence of any represented printer as an object of collection of monitor information files and combines only the monitor information files stored in the spool directory 22 to create an upload file Fu (step S440). The created upload file Fu is stored, is compressed, and is uploaded to the management server SV (step S450). The upload of the upload file Fu to the management server SV adopts the SSL (Secure Socket Layer) standard for the enhanced security.

In the event of reception of any response to the broadcast inquiry from any of the represented printers (step S420: yes), on the other hand, the CPU 10 makes an FTP connection with one of the represented printers as senders of the responses to the broadcast inquiry (step S430) and sends an inquiry to the FTP-connected represented printer about the presence of any monitor information file as the object to be uploaded to the management server SV (step S432). When the FTP-connected represented printer has any monitor information file as the object to be uploaded to the management server SV (step S432: yes), the CPU 10 sends a transmission request for all the object monitor information files and receives copies of all the object monitor information files (step S434). The received copies of the object monitor information files are stored into the 'other' directory 24. The CPU 10 subsequently cuts off the FTP connection (step S436). When the FTP-connected represented printer has no monitor information file as the object to be uploaded to the management server SV (step S432: no), on the other hand, the CPU 10 immediately cuts off the FTP connection without any further processing (step S436).

The CPU 10 determines whether the processing of steps S430 to S436 has been completed for all the represented printers as the senders of the responses to the broadcast inquiry (step S438). When there is any represented printer that has not yet been the target of the processing of steps S430 to S436 (step S438: no), the upload process goes back to step S430. When the processing of steps S430 to S436 has been completed for all the represented printers as the senders of the responses to the broadcast inquiry (step S438: yes), on the other hand, the CPU 10 combines the monitor information files stored in the spool directory 22 with the monitor information files stored in the 'other' directory 24 to create an upload file Fu (step S440). The created upload file Fu is stored, is compressed, and is uploaded to the management server SV (step S450).

The CPU 10 then identifies successful upload or failed upload (step S460). This identification is based on reception of a reception complete response to the upload from the management server SV. In the event of reception of the reception complete response to the upload from the management server SV, the CPU 10 identifies successful upload. In the event of no reception of the reception complete response to the upload from the management server SV, on the contrary, the CPU 10 identifies failed upload.

In the case of successful upload (step S460: yes), the CPU 10 makes an FTP connection with one of the represented printers as the senders of the monitor information files received at step S434 (step S470) and sends a deletion request for deletion of each uploaded monitor information file to the FTP-connected represented printer (step S472). One deletion request is sent for one uploaded monitor information file. The FTP-connected represented printer receives the deletion request and deletes the uploaded monitor information file. This leaves only unsent monitor information files, which have not yet been sent to the management server SV, in the spool directory 22 of the represented printer. This arrangement enables the CPU 10 to readily identify the presence of any unsent monitor information file in the spool directory 22.

The CPU 10 determines whether the deletion request has been sent for all the uploaded monitor information files in the FTP-connected represented printer (step S474). When there is any uploaded monitor information file that has not yet received the deletion request (step S474: no), the upload process goes back to step S472. When the deletion request has been sent for all the uploaded monitor information files (step S474: yes), on the other hand, the CPU 10 cuts off the FTP connection with the represented printer (step S476).

The CPU 10 then determines whether the processing of steps S470 to S474 has been completed for all the represented printers as the senders of the monitor information files (step S478). When there is any represented printer that has not yet been the target of the processing of steps S470 to S474 (step S478: no), the upload process goes back to step S470. When the processing of steps S470 to S474 has been completed for all the represented printers as the senders of the monitor information files (step S478: yes), on the other hand, the CPU 10 deletes the uploaded monitor information files stored in the own spool directory 22 (step S480). The CPU 10 successively deletes the upload file Fu stored in the upload directory 26 and the monitor information files collected from the represented printers and stored in the 'other' directory 24 (step S490).

In the event of failed upload (step S460: no), on the other hand, the CPU 10 deletes the upload file Fu stored in the upload directory 26 and the monitor information files collected from the represented printers and stored in the 'other' directory 24 (step S490), while keeping the monitor information files stored in the spool directory 22 until execution of the upload process by any printer PRT. The CPU 10 then terminates the upload process.

In the device management system 1000 of the first embodiment described above, when the spool directory 22 has any unsent monitor information file that has not yet been sent to the management server SV at the upload time, the printer PRT functions as the representative printer that collects the monitor information files from the other printers PRT and uploads the collected monitor information files with the unsent monitor information files stored in the own spool directory 22 to the management server SV. When the spool directory 22 has no unsent monitor information file that has not yet been sent to the management server SV at the upload time, the printer PRT does not function as the representative printer that collects the monitor information files from the other printers PRT and uploads the upload file to the management server SV. This arrangement desirably reduces the access frequency from the respective printers PRT to the management server SV.

In the device management system 1000 of the first embodiment, the representative printer is not fixed but any of the multiple printers PRT may function as the representative printer. The printer PRT specified as the representative printer collects the monitor information from all the other printers PRT specified as the represented printers and uploads the collected monitor information with the own monitor information to the management server SV.

B. Second Embodiment

A device management system 1000 of a second embodiment has the same configuration as that of the device management system 1000 of the first embodiment. Each printer PRT in the second embodiment has the same structure as that of the printer PRT in the first embodiment. The processing executed by the CPU 10 of the custom network board CNB attached to the printer PRT of the second embodiment is partially different from the processing executed by the printer PRT of the first embodiment. The following describes the difference from the first embodiment.

Figure 8:
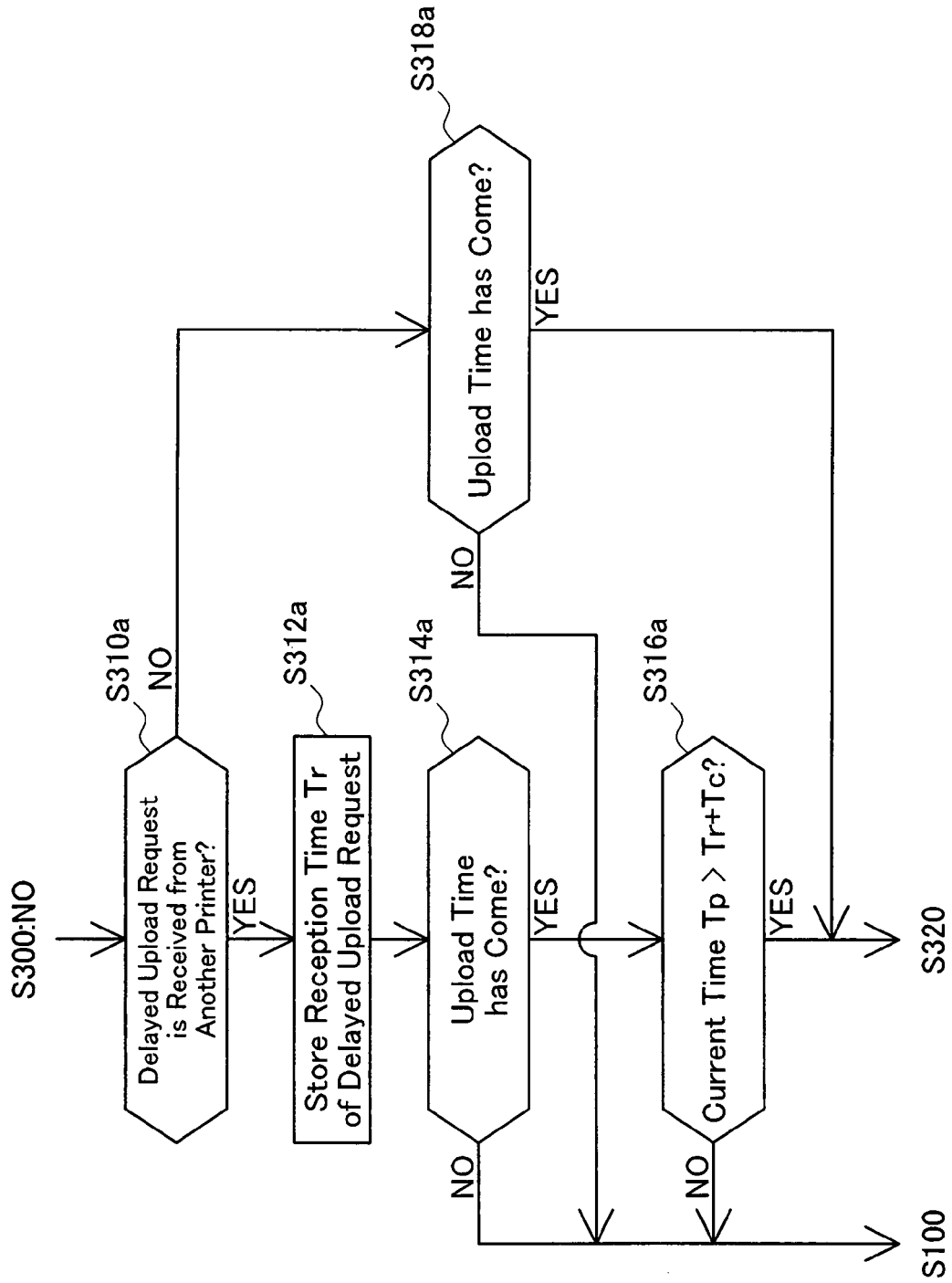
FIG. 8 is a flowchart showing a general operation flow of the printer PRT executed in a second embodiment of the invention.

FIG. 8 is a flowchart showing a general operation flow of the printer PRT executed in the second embodiment. The processing flow of FIG. 8 is executed instead of the processing of step S310 in the general operation flow of the first embodiment (see FIG. 4). In the second embodiment, the representative printer sends a delayed upload request to the represented printers in the case of successful upload of the upload file Fu to the management server SV as described below.

On no occurrence of any critical event in the printer main body 100 (step S300: no) in the flowchart of FIG. 4, the CPU 10 identifies reception or no reception of a delayed upload request from another printer or the representative printer (step S310a). In the case of reception of the delayed upload request (step S310a: yes), the CPU 10 refers to the timer 30 and stores a reception time Tr of the delayed upload request into the memory 20 (step S312a).

The CPU 10 then refers to the timer 30 and determines whether the upload time has come (step S314a). When the upload time has not yet come (step S314a: no), the general operation flow returns to step S100 in the flowchart of FIG. 4. When the upload time has come (step S314a: yes), on the other hand, the CPU 10 determines whether a current time Tp is after elapse of a preset time Tc from the reception time Tr of the delayed upload request (step S316a). The preset time Tc may be determined arbitrarily. When the current time Tp is not after elapse of the preset time Tc from the reception time Tr of the delayed upload request (step S316a: no), the general operation flow returns to step S100 in the flowchart of FIG. 4. When the current time Tp is after elapse of the preset time Tc from the reception time Tr of the delayed upload request (step S316a: yes), on the other hand, the general operation flow goes to step S320 in the flowchart of FIG. 4.

In the case of no reception of the delayed upload request from the representative printer (step S310a: no), the CPU 10 refers to the timer 30 and determines whether the upload time has come (step S318a). When the upload time has not yet come (step S318a: no), the general operation flow returns to step S100 in the flowchart of FIG. 4. When the upload time has come (step S318a: yes), the general operation flow goes to step S320 in the flowchart of FIG. 4.

Figure 9:
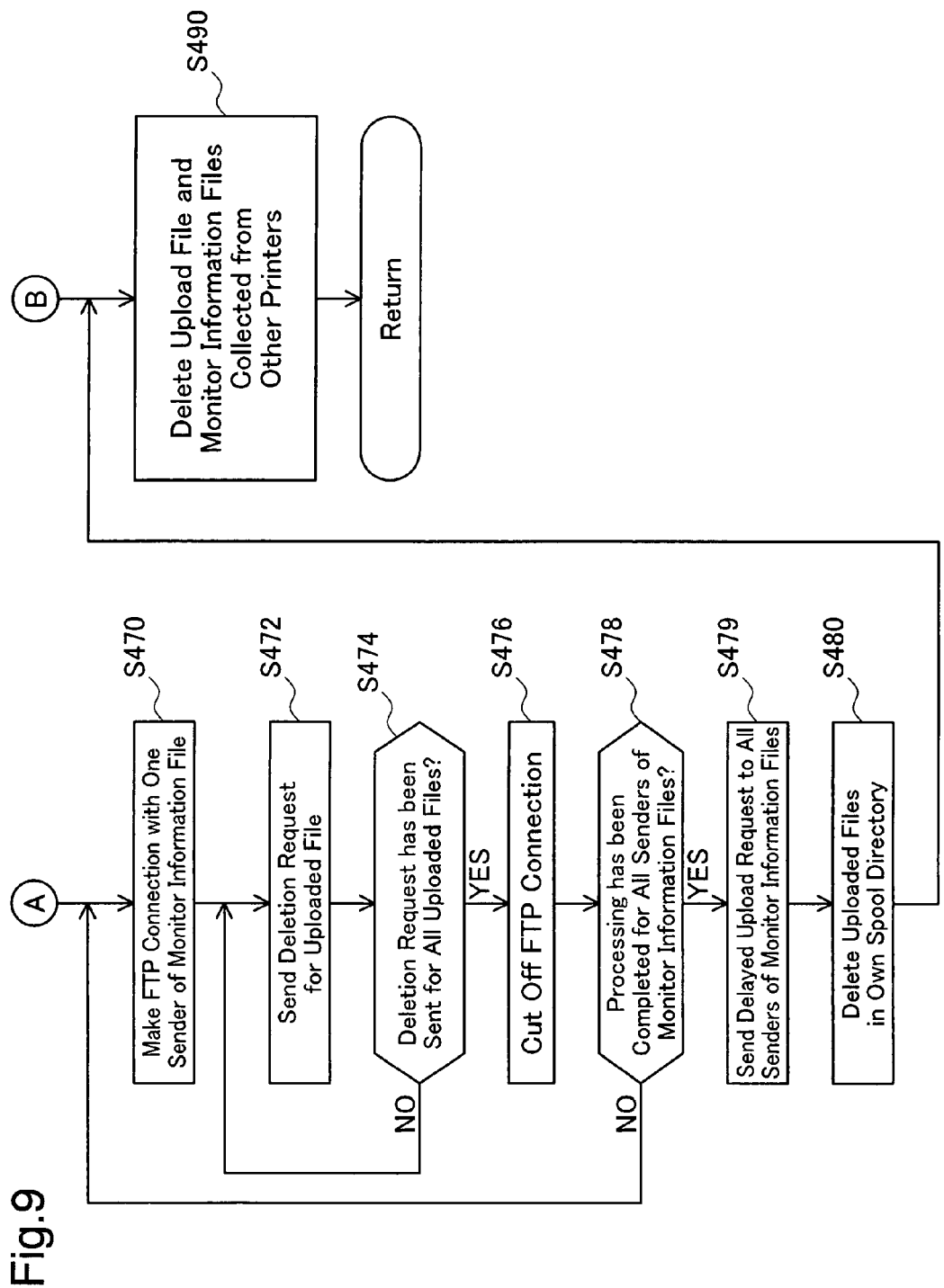
FIG. 9 is a flowchart showing the details of an upload process executed in the second embodiment.

FIG. 9 is a flowchart showing an upload process executed in the second embodiment. The upload process of the second embodiment includes a partly different processing flow after step S460 from the upload process of the first embodiment (see FIGS. 6 and 7). Specifically the upload process of the second embodiment has step S479 between step S478 and step S480 in the flowchart of FIG. 7. Otherwise the upload process of the second embodiment is identical with the upload process of the first embodiment.

In the case of successful upload (step S460: yes) in the flowchart of FIG. 6, the CPU 10 makes an FTP connection with one of the represented printers as the senders of the monitor information files received at step S434 (step. S470) and sends a deletion request for deletion of each uploaded monitor information file to the FTP-connected represented printer (step S472). One deletion request is sent for one uploaded monitor information file. The FTP-connected represented printer receives the deletion request and deletes the uploaded monitor information file.

The CPU 10 determines whether the deletion request has been sent for all the uploaded monitor information files in the FTP-connected represented printer (step S474). When there is any uploaded monitor information file that has not yet received the deletion request (step S474: no), the upload process goes back to step S472. When the deletion request has been sent for all the uploaded monitor information files (step S474: yes), on the other hand, the CPU 10 cuts off the FTP connection with the represented printer (step S476).

The CPU 10 then determines whether the processing of steps S470 to S474 has been completed for all the represented printers as the senders of the monitor information files (step S478). When there is any represented printer that has not yet been the target of the processing of steps S470 to S474 (step S478: no), the upload process goes back to step S470. When the processing of steps S470 to S474 has been completed for all the represented printers as the senders of the monitor information files (step S478: yes), on the other hand, the CPU 10 sends the delayed upload request to all the represented printers as the senders of the monitor information files (step S479). When the upload time set in each represented printer has come, the represented printer determines specification or non-specification as the representative printer in response to the received delayed upload request.

The CPU 10 then deletes the uploaded monitor information files stored in the own spool directory 22 (step S480). The CPU 10 successively deletes the upload file Fu stored in the upload directory 26 and the monitor information files collected from the represented printers and stored in the 'other' directory 24 (step S490).

In the event of failed upload (step S460: no), on the other hand, the CPU 10 deletes the upload file Fu stored in the upload directory 26 and the monitor information files collected from the represented printers and stored in the 'other' directory 24 (step S490), while keeping the monitor information files stored in the spool directory 22 until execution of the upload process by any printer PRT. The CPU 10 then terminates the upload process.

In the device management system 1000 of the second embodiment described above, when the preset time Tc has not yet elapsed at the upload time since reception of the delayed upload request from the representative printer, even in the presence of any unsent monitor information file, which has not yet been sent to the management server SV, in the spool directory 22, the printer PRT determines that it is not the moment of collecting the monitor information files from the other printers PRT and uploading the collected monitor information files with the unsent monitor information files to the management server SV. The printer PRT accordingly does not function as the representative printer but suspends the collection of the monitor information files from the other printers PRT and the upload of the upload file to the management server SV until a next upload time. The device management system 1000 of the second embodiment preferably uses only one printer PRT as the representative printer to the maximum possible extent and prevents the multiple printers PRT from individually performing the upload process. This arrangement further reduces the access frequency from the respective printers PRT to the management server SV, compared with the device management system 1000 of the first embodiment.

C. Third Embodiment

A device management system 1000 of a third embodiment has the same configuration as that of the device management system 1000 of the first embodiment. Each printer PRT in the third embodiment has the same structure as that of the printer PRT in the first embodiment. The processing executed by the CPU 10 of the custom network board CNB attached to the printer PRT of the third embodiment is partially different from the processing executed by the printer PRT of the first embodiment. The following describes the difference from the first embodiment.

Figure 10:
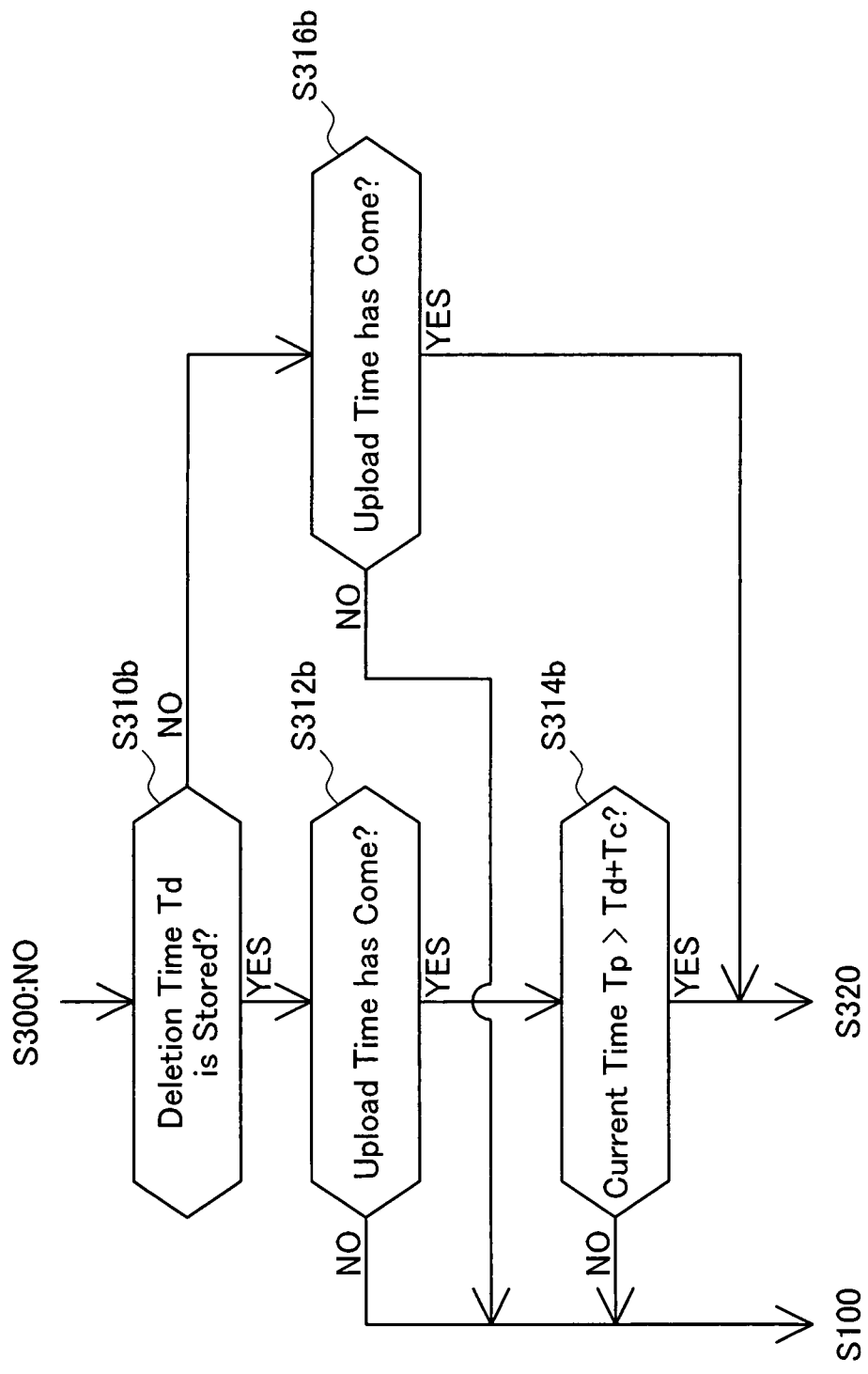
FIG. 10 is a flowchart showing a general operation flow of the printer PRT executed in a third embodiment of the invention.

FIG. 10 is a flowchart showing a general operation flow of the printer PRT executed in the third embodiment. The processing flow of FIG. 10 is executed instead of the processing of step S310 in the general operation flow of the first embodiment (see FIG. 4). In the third embodiment, each represented printer stores a deletion time Td into the memory 20 when the monitor information file is deleted in response to the received deletion request.

On no occurrence of any critical event in the printer main body 100 (step S300: no) in the flowchart of FIG. 4, the CPU 10 identifies storage or non-storage of a deletion time Td in the memory 20 (step S310b). In the case of storage of the deletion time Td in the memory 20 (step S310b: yes), the CPU 10 refers to the timer 30 and determines whether the upload time has come (step S312b). When the upload time has not yet come (step S312b: no), the general operation flow returns to step S100 in the flowchart of FIG. 4. When the upload time has come (step S312b: yes), on the other hand, the CPU 10 determines whether a current time Tp is after elapse of a preset time Tc from the deletion time Td (step S314b). The preset time Tc may be determined arbitrarily. When the current time Tp is not after elapse of the preset time Tc from the deletion time Td (step S314b: no), the general operation flow returns to step S100 in the flowchart of FIG. 4. When the current time Tp is after elapse of the preset time Tc from the deletion time Td (step S314b: yes), on the other hand, the general operation flow goes to step S320 in the flowchart of FIG. 4.

In the case of non-storage of the deletion time Td in the memory (step S310b: no), the CPU 10 refers to the timer 30 and determines whether the upload time has come (step S316b). When the upload time has not yet come (step S316b: no), the general operation flow returns to step S100 in the flowchart of FIG. 4. When the upload time has come (step S316b: yes), the general operation flow goes to step S320 in the flowchart of FIG. 4.

In the device management system 1000 of the third embodiment described above, when the preset time Tc has not yet elapsed at the upload time since previous transmission of a monitor information file and deletion of the sent monitor information file, even in the presence of any unsent monitor information file, which has not yet been sent to the management server SV, in the spool directory 22, the printer PRT determines that it is not the moment of collecting the monitor information files from the other printers PRT and uploading the collected monitor information files with the unsent monitor information files to the management server SV. The printer PRT accordingly does not function as the representative printer but suspends the collection of the monitor information files from the other printers PRT and the upload of the upload file to the management server SV until a next upload time. This arrangement also further reduces the access frequency from the respective printers PRT to the management server SV, compared with the device management system 1000 of the first embodiment.

D. Fourth Embodiment

A device management system 1000 of a fourth embodiment has the same configuration as that of the device management system 1000 of the first embodiment. Each printer PRT in the fourth embodiment has the same structure as that of the printer PRT in the first embodiment. The processing executed by the CPU 10 of the custom network board CNB attached to the printer PRT of the fourth embodiment is partially different from the processing executed by the printer PRT of the first embodiment. The following describes the difference from the first embodiment.

Figure 11:
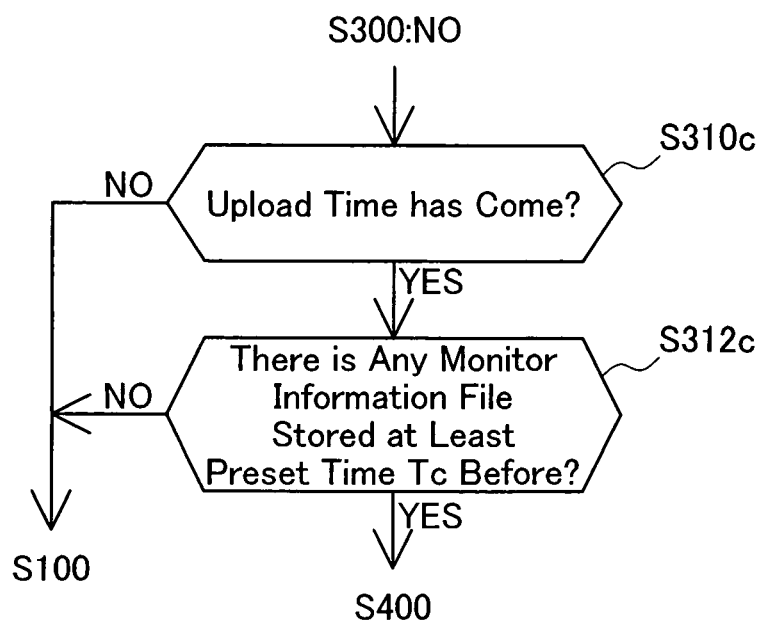
FIG. 11 is a flowchart showing a general operation flow of the printer PRT executed in a fourth embodiment of the invention.

FIG. 11 is a flowchart showing a general operation flow of the printer PRT executed in the fourth embodiment. The processing flow of FIG. 11 is executed instead of the processing of steps S310 and S320 in the general operation flow of the first embodiment (see FIG. 4). In the fourth embodiment, each printer PRT uses a storage time of each monitor information file stored in the spool directory 22.

On no occurrence of any critical event in the printer main body 100 (step S300: no) in the flowchart of FIG. 4, the CPU 10 refers to the timer 30 and determines whether the upload time has come (step S310c). When the upload time has not yet come (step S310c: no), the general operation flow returns to step S100 in the flowchart of FIG. 4. When the upload time has come (step S310c: yes), on the other hand, the CPU 10 determines whether there is any monitor information file that was stored at least a preset time Tc before in the spool directory 22 (step S312c). The preset time Tc may be determined arbitrarily. When the spool directory 22 has no monitor information file that was stored at least the preset time Tc before (step S312c: no), it is determined that there is no monitor information file to be sent to the management server SV immediately. The printer PRT is thus not specified as the representative printer and the general operation flow goes back to step S100 in the flowchart of FIG. 4. When the spool directory 22 has any monitor information file that was stored at least the preset time Tc before (step S312c: yes), on the other hand, it is determined that the stored monitor information file is to be sent to the management server SV immediately. The general operation flow thus goes to step S400 in the flowchart of FIG. 4 to specify the printer PRT as the representative printer and perform the upload process.

In the device management system 1000 of the fourth embodiment described above, when the spool directory 22 at the upload time has no unsent monitor information file that was stored at least the preset time Tc before, irrespective of the presence of any unsent monitor information file, the printer PRT determines that it is not the moment of collecting the monitor information files from the other printers PRT and uploading the collected monitor information files with the unsent monitor information files to the management server SV. The printer PRT accordingly does not function as the representative printer but suspends the collection of the monitor information files from the other printers PRT and the upload of the upload file to the management server SV until a next upload time. In the device management system 1000 of the fourth embodiment, during the preset time after execution of the upload process by any printer PRT specified as the representative printer, no other printer PRT performs the upload process. This arrangement also reduces the access frequency from the respective printers PRT to the management server SV.

E. Fifth Embodiment

A device management system 1000 of a fifth embodiment has the same configuration as that of the device management system 1000 of the first embodiment.

In the fifth embodiment, after transmission of monitor information to the management server SV, the representative printer notifies each represented printer of the self function as the representative printer in a current upload process. In principle, this notification means that the representative printer in the current upload process will be the representative printer again in a next upload process. Each of the represented printers receives this notification and successively sends monitor information generated on the occurrence of each event to the printer PRT that is the representative printer in the current upload process and will be the representative printer again in a next upload process. The representative printer PRT receives the monitor information successively sent from the respective represented printers. At a next upload time, the representative printer PRT does not send the transmission request for the monitor information to the respective represented printers but uploads the own monitor information and the monitor information received from the respective represented printers to the management server SV.

The representative printer is changed over, for example, in the event of failed transmission of monitor information to the management server SV due to a power-off of the printer PRT expected to be the representative printer or on the occurrence of a critical event requiring the urgent notification to the management server SV in any of the represented printers PRT. Namely in the device management system 1000 of the fifth embodiment, neither the representative printer nor the represented printers are fixed. The representative printer is changed over according to the operating statuses of the respective printers PRT. The change-over of the representative printer will be described later in detail.

E1. Structure of Printer

Each printer PRT in the fifth embodiment has the same structure as that of the printer PRT in the first embodiment. The processing executed by the CPU 10 of the custom network board CNB attached to the printer PRT of the fifth embodiment is partially different from the processing executed by the printer PRT of the first embodiment. The following describes the difference from the first embodiment.

The printer controller 120 is equivalent to the monitor information generation module of the invention.

The data stored in the memory 20 include a file representing identification information of the specified representative printer, as well as monitor information files recording the own monitor information obtained from the printer controller 120, monitor information files received from the respective other printers PRT, and an upload file to be sent to the management server SV.

The decision module 14 makes decisions with regard to a printer general operation flow, a file collection process, and an upload process described later.

E2. Printer General Operation Flow

Figure 12:
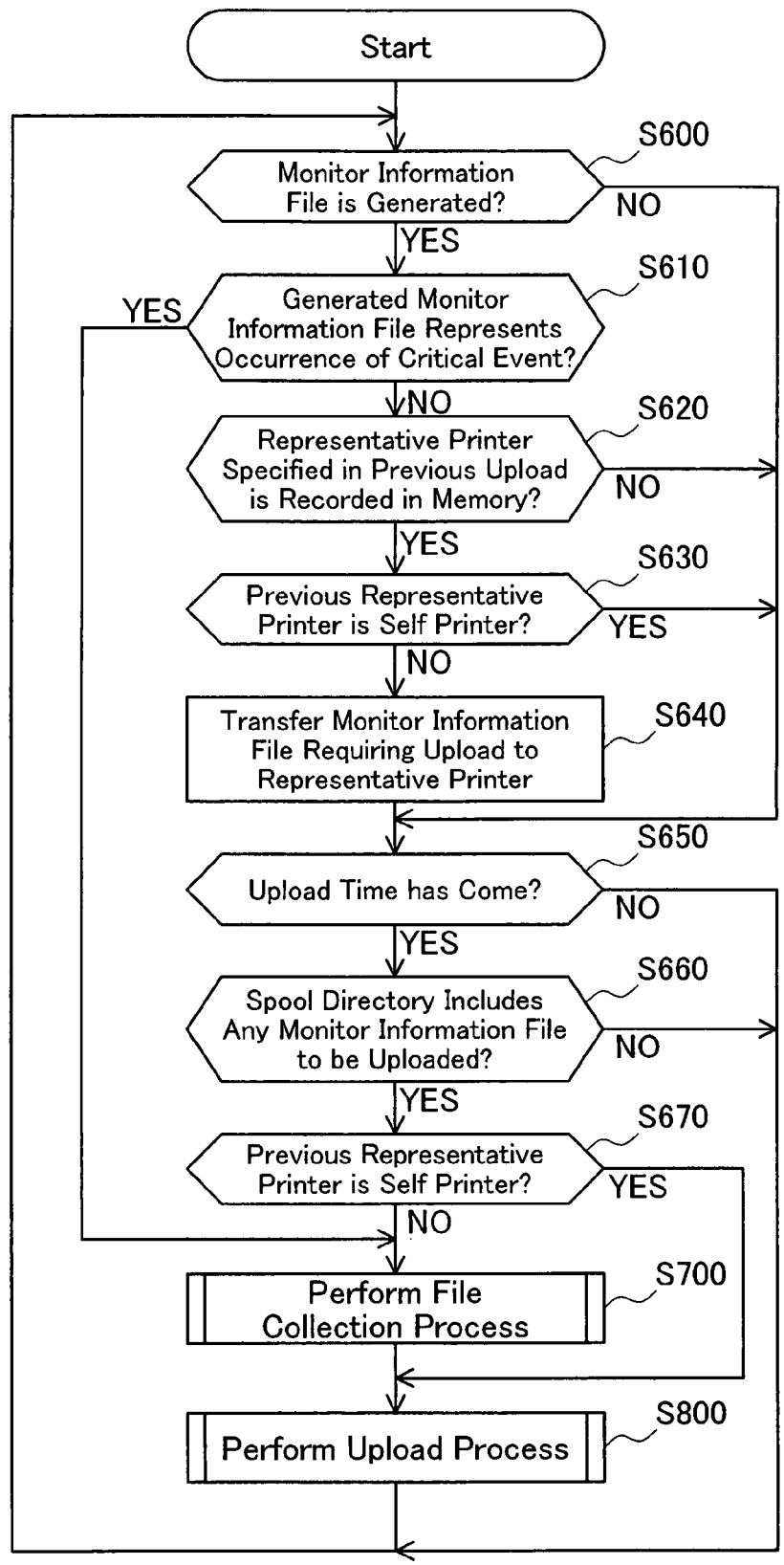
FIG. 12 is a flowchart showing a general operation flow of the printer PRT executed in a fifth embodiment of the invention.

FIG. 12 is a flowchart showing a general operation flow of the printer PRT. The general operation flow starts in response to a power-on operation and is continually performed until a power-off operation by the CPU 10 of the custom network board CNB in each printer PRT.

The CPU 10 first detects the occurrence of an event in the printer main body 100 and generation of a monitor information file (step S600). Upon generation of a monitor information file (step S600: yes), the CPU 10 stores the generated monitor information file into the spool directory 22 and identifies whether the monitor information file represents the occurrence of a critical event (step S610). The critical event requires an urgent notification to the management server SV and is, for example, malfunction of the printer engine 110 or failed color adjustment by the printer controller 120.

When the generated monitor information file does not represent the occurrence of any critical event (step S610: no), the CPU 10 determines whether a file representing the identification information of the representative printer specified in a previous upload process is recorded in the memory 20 (step S620). This file is not recorded in the initial stage at the power-on of the printer PRT. When the file representing the identification information of the representative printer specified in the previous upload process is recorded in the memory 20 (step S620: yes), the CPU 10 identifies whether the representative printer specified in the previous upload process is the self printer PRT (step S630). When the representative printer specified in the previous upload process is not the self printer PRT (step S630: no), the CPU 10 expects that the printer PRT recorded as the representative printer in the previous upload process will function again as the representative printer in a next upload process. Any monitor information file to be uploaded to the management server SV is then transferred to the printer PRT recorded as the representative printer in the previous upload process (step S640).

The CPU 10 subsequently refers to the timer 30 and determines whether the upload time has come (step S650). The determination of step S650 is also executed when no monitor information file is generated (step S600: no), when no file representing the identification information of the representative printer specified in the previous upload process is recorded in the memory 20 (step S620: no), or when the representative printer specified in the previous upload process is the self printer PRT (step S630: yes).

When the upload time has not yet come (step S650: no), the general operation flow returns to step S600. When the upload time has come (step S650: yes), on the other hand, the CPU 10 determines whether the spool directory 22 stores any monitor information file to be uploaded to the management server SV (step S660).

When the spool directory 22 does not include any monitor information file to be uploaded to the management server SV (step S660: no), the general operation flow returns to step S600. When the spool directory 22 includes any monitor information file to be uploaded to the management server SV (step S660: yes), on the other hand, the CPU 10 identifies whether the representative printer specified in the previous upload process is the self printer PRT (step S670).

When the representative printer specified in the previous upload process is the self printer PRT (step S670: yes), the CPU 10 makes the self printer PRT function as the representative printer and performs an upload process (step S800). When the representative printer specified in the previous upload process is not the self printer PRT (step S670: no), on the other hand, the CPU 10 changes over the function of the self printer PRT from the represented printer to the representative printer and successively performs a file collection process (step S700) and the upload process (step S800). The details of the file collection process and the upload process will be described later.

When the generated monitor information file represents the occurrence of any critical event (step S610: yes), regardless of the representative printer specified in the previous upload process, the CPU 10 makes the self printer PRT as the representative printer and successively performs the file collection process (step S700) and the upload process (step S800). On the occurrence of any critical event requiring the urgent notification to the management server SV, the printer PRT can immediately notify the management server SV of the occurrence of the critical event.

On completion of the upload process, the general operation flow returns to step S600 and repeats the above series of processing.

E3. File Collection Process

Figure 13:
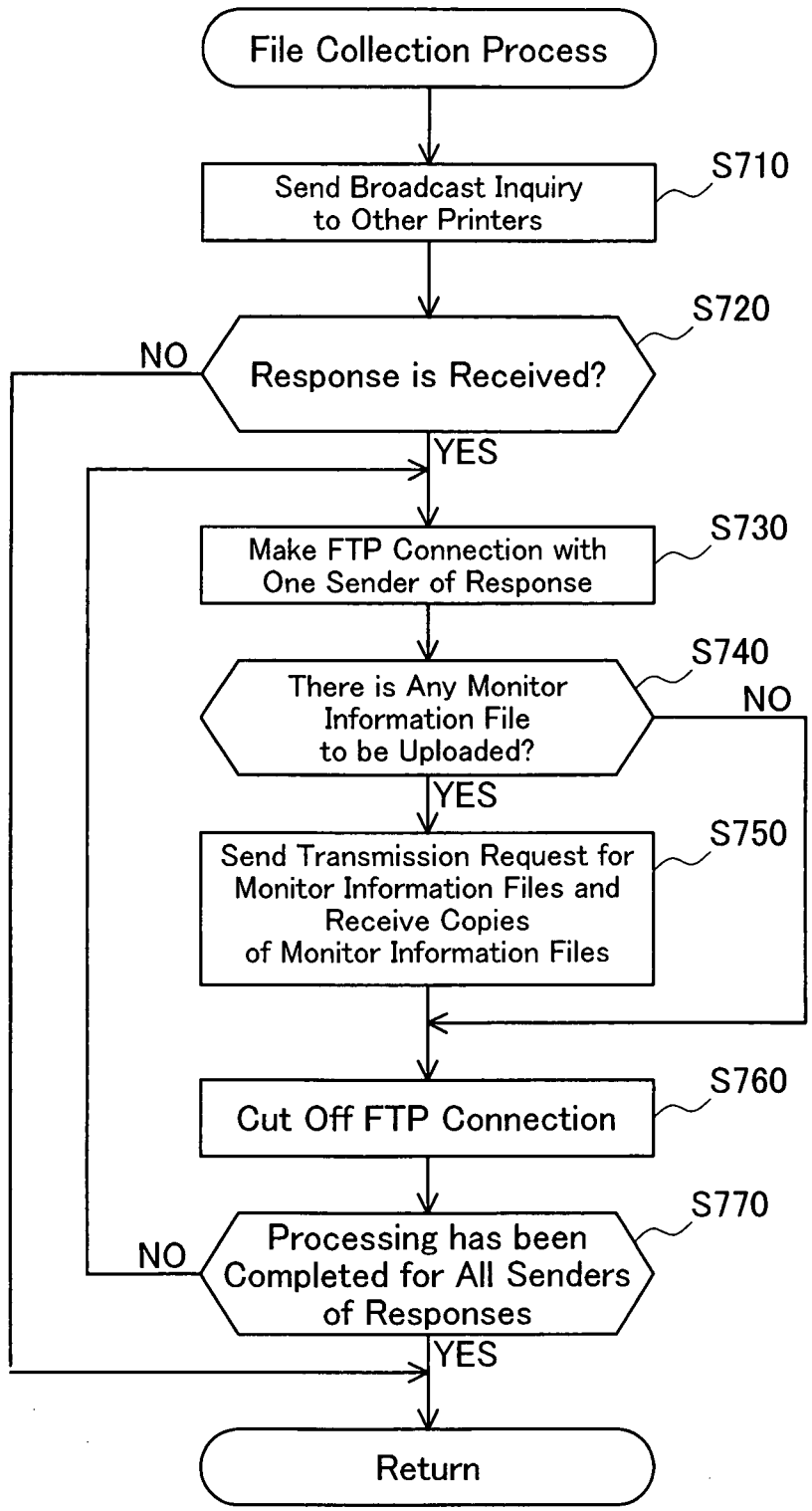
FIG. 13 is a flowchart showing the details of a file collection process executed in the fifth embodiment.

FIG. 13 is a flowchart showing the details of the file collection process executed at step S700 in the general operation flow of FIG. 12. When the occurrence of any critical event in some printer PRT requires immediate performance of the upload process or when the representative printer specified in the previous upload process is powered off or otherwise falls into the state of failed upload and another printer PRT is specified as the new representative printer, the CPU 10 of the representative printer performs this file collection process.

The CPU 10 of the representative printer sends a broadcast inquiry for confirmation of the presence to all the other printers PRT connected to the local area network LAN (step S710). The CPU 10 then determines whether a response to the broadcast inquiry is received from any of the other printers PRT (step S720). In the case of no reception of any response to the broadcast inquiry from any of the other printers PRT (step S720: no), the CPU 10 identifies the absence of any represented printer as an object of collection of monitor information files and immediately terminates the file collection process.

In the event of reception of any response to the broadcast inquiry from any of the other printers PRT (step S720: yes), on the other hand, the CPU 10 makes an FTP connection with one of the other printers PRT as senders of the responses to the broadcast inquiry (step S730) and sends an inquiry to the FTP-connected printer PRT about the presence of any monitor information file as the object to be uploaded to the management server SV (step S740). When the FTP-connected printer PRT has any monitor information file as the object to be uploaded to the management server SV (step S740: yes), the CPU 10 sends a transmission request for all the object monitor information files and receives copies of all the object monitor information files (step S750). The received copies of the object monitor information files are stored in the 'other' directory 24. The CPU 10 subsequently cuts off the FTP connection (step S760). When the FTP-connected printer PRT has no monitor information file as the object to be uploaded to the management server SV (step S740: no), on the other hand, the CPU 10 immediately cuts off the FTP connection without any further processing (step S760).

The CPU 10 determines whether the processing of steps S730 to S760 has been completed for all the other printers PRT as the senders of the responses to the broadcast inquiry (step S770). When there is any printer PRT that has not yet been the target of the processing of steps S730 to S760 (step S770: no), the file collection process goes back to step S730. When the processing of steps S730 to S760 has been completed for all the other printers PRT as the senders of the responses to the broadcast inquiry (step S770: yes), on the other hand, the CPU 10 terminates the file collection process.

E4. Upload Process

Figure 14:
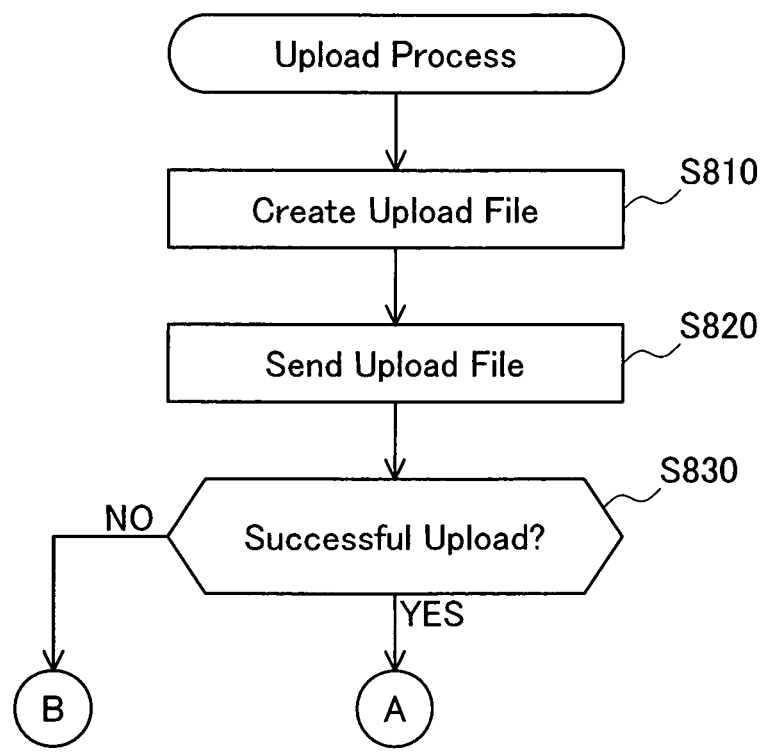
FIG. 14 is a flowchart showing the details of an upload process executed in the fifth embodiment.
Figure 15:
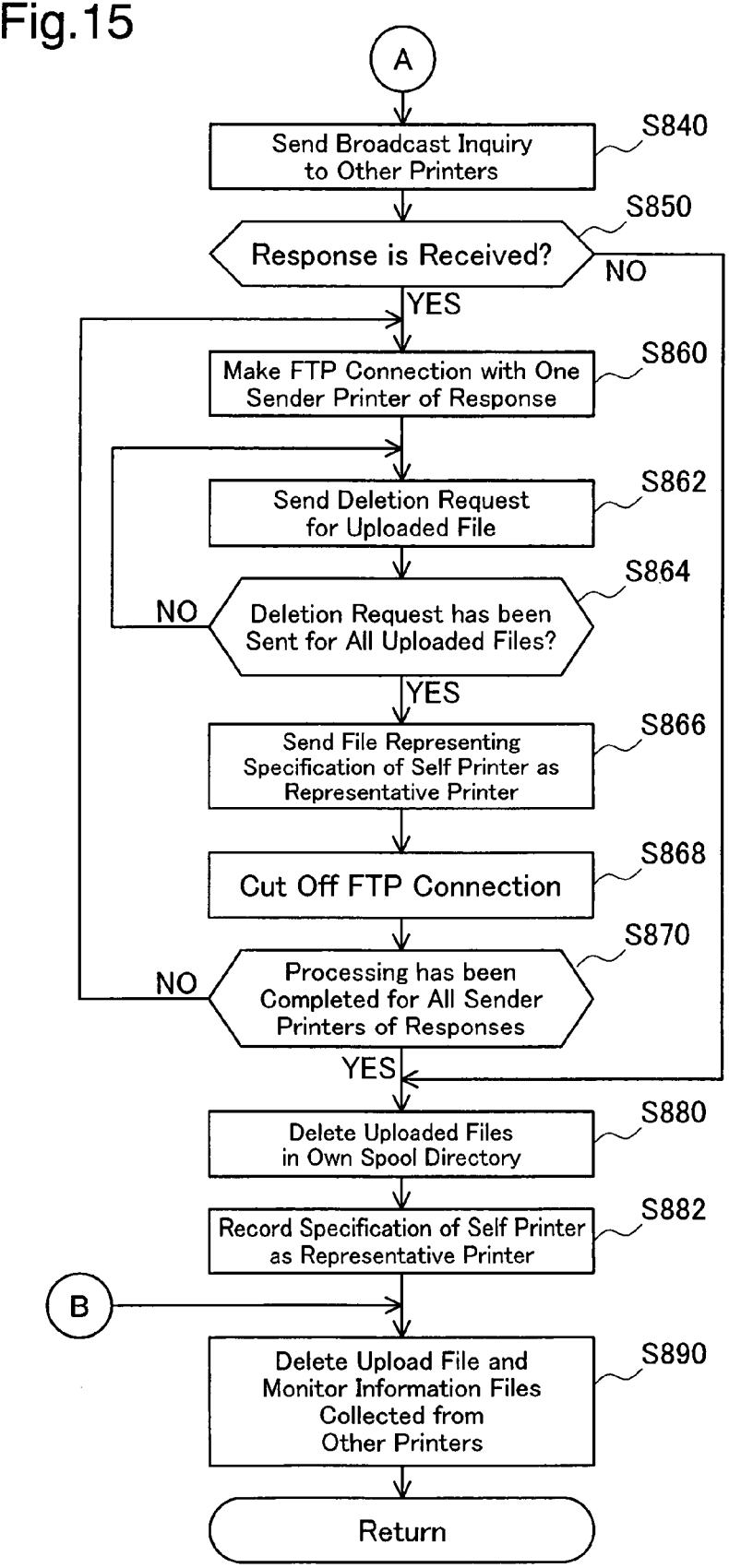
FIG. 15 is a flowchart showing the details of the upload process executed in the fifth embodiment.

FIGS. 14 and 15 are flowcharts showing the details of the upload process executed at step S800 in the general operation flow of FIG. 12. The upload process is performed by the CPU 10 of the representative printer.

The CPU 10 combines the monitor information files stored in the spool directory 22 with the monitor information files stored in the 'other' directory 24 to create an upload file Fu (step S810). The created upload file Fu is stored in the upload directory 26. The CPU 10 then compresses the upload file Fu and uploads the compressed upload file Fu to the management server SV (step S820). The upload of the upload file Fu to the management server SV adopts the SSL (Secure Socket Layer) standard for the enhanced security.

The CPU 10 then identifies successful upload or failed upload (step S830). This identification is based on reception of a reception complete response to the upload from the management server SV. In the event of reception of the reception complete response to the upload from the management server SV, the CPU 10 identifies successful upload. In the event of no reception of the reception complete response to the upload from the management server SV, on the contrary, the CPU 10 identifies failed upload.

In the case of successful upload (step S830: yes), the CPU 10 sends a broadcast inquiry for confirmation of the presence to all the other printers PRT connected to the local area network LAN (step S840). The CPU 10 then determines whether a response to the broadcast inquiry is received from any of the other printers PRT (step S850).

In the event of reception of any response to the broadcast inquiry from any of the other printers PRT (step S850: yes), the CPU 10 makes an FTP connection with one of the other printers PRT as senders of the responses to the broadcast inquiry (step S860) and sends a deletion request for deletion of each uploaded monitor information file to the FTP-connected printer PRT (step S862). One deletion request is sent for one uploaded monitor information file. When the FTP-connected printer PRT is newly powered on or otherwise to have no storage of any uploaded monitor information file, the deletion request is not sent to the FTP-connected printer PRT. The FTP-connected printer PRT receives the deletion request from the representative printer and deletes the uploaded monitor information file stored therein. This leaves only unsent monitor information files, which have not yet been sent to the management server SV, in the spool directory 22 of the FTP-connected printer PRT receiving the deletion request. This arrangement enables the CPU 10 to readily identify the presence of any unsent monitor information file in the spool directory 22.

The CPU 10 determines whether the deletion request has been sent for all the uploaded monitor information files in the FTP-connected printer PRT (step S864). When there is any uploaded monitor information file that has not yet received the deletion request (step S864: no), the upload process goes back to step S862. When the deletion request has been sent for all the uploaded monitor information files (step S864: yes), on the other hand, the CPU 10 sends a file representing identification information of the self printer specified as the representative printer to the FTP-connected printer PRT (step S866). The file is stored into the memory 20 of the FTP-connected printer PRT. The CPU 10 subsequently cuts off the FTP connection with the printer PRT (step S868).

The CPU 10 then determines whether the processing of steps S860 to S368 has been completed for all the other printers PRT as the senders of the responses to the broadcast inquiry sent at step S840 (step S870). When there is any printer PRT that has not yet been the target of the processing of steps S860 to S368 (step S870: no), the upload process goes back to step S860. When the processing of steps S860 to S368 has been completed for all the other printers PRT as the senders of the responses to the broadcast inquiry (step S870: yes), on the other hand, the CPU 10 deletes the uploaded monitor information files stored in the own spool directory 22 (step S880). The CPU 10 then creates a file representing specification of the self printer as the representative printer in the current upload process and records the created file into the memory 20 (step S882). The CPU 10 successively deletes the upload file Fu stored in the upload directory 26 and the monitor information files collected from the other printers PRT and stored in the 'other' directory 24 (step S890). The CPU 10 then terminates the upload process.

In the case of no reception of any response to the broadcast inquiry from any of the other printers PRT (step S850: no), the CPU 10 identifies the absence of any working printer PRT and goes to step S880.

In the event of failed upload (step S830: no), on the other hand, the CPU 10 deletes the upload file Fu stored in the upload directory 26 and the monitor information files collected from the other printers PRT and stored in the 'other' directory 24 (step S890), while keeping the monitor information files stored in the spool directory 22 until execution of the file collection process and the upload process by any printer PRT. The CPU 10 then terminates the upload process.

In the device management system 1000, of the fifth embodiment described above, the representative printer collectively uploads the own monitor information and the monitor information received from the represented printers to the management server SV. This arrangement desirably reduces the access frequency from the respective printers PRT to the management server SV. In response to the occurrence of any event, each represented printer successively sends a monitor information file to the representative printer. Even when a large number of printers PRT are connected to the device management system 1000, this arrangement prevents simultaneous transmission of monitor information files from a large number of represented printers to the representative printer. This arrangement effectively restrains an abrupt increase in network traffic by simultaneous transmission of the monitor information files from the respective represented printers to the representative printer. The device management system 1000 of the fifth embodiment desirably reduces the access frequency from the respective printers PRT to the management server SV and restrains an abrupt increase in network traffic by the simultaneous transmission of the monitor information files.

F. Sixth Embodiment

A device management system 1000 of a sixth embodiment has the same configuration as that of the device management system 1000 of the fifth embodiment. Each printer PRT in the sixth embodiment has the same structure as that of the printer PRT in the fifth embodiment. The processing executed by the CPU 10 of the custom network board CNB attached to the printer PRT of the sixth embodiment is partially different from the processing executed by the printer PRT of the fifth embodiment. The following describes the difference from the fifth embodiment.

Figure 16:
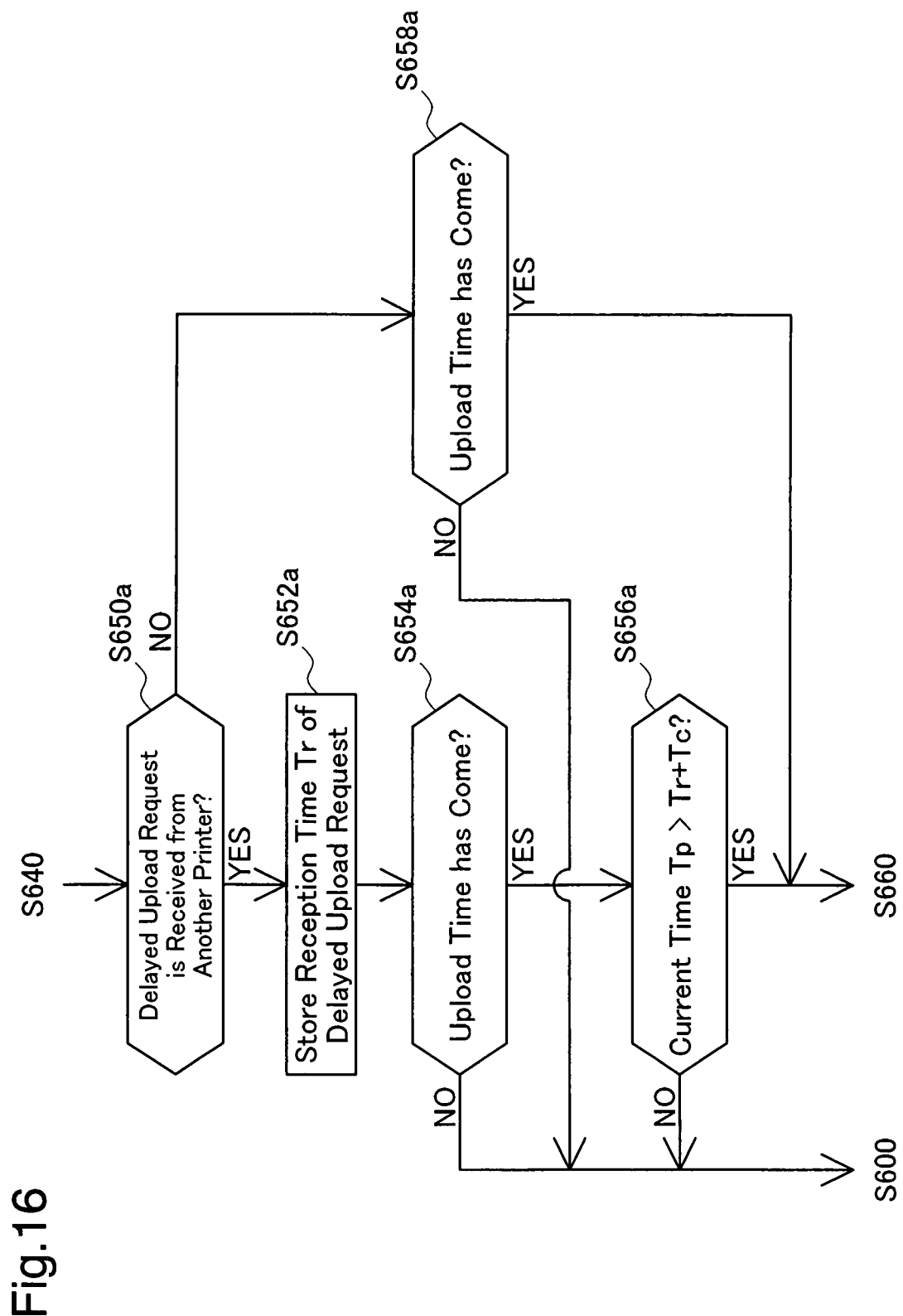
FIG. 16 is a flowchart showing a general operation flow of the printer PRT executed in a sixth embodiment of the invention.

FIG. 16 is a flowchart showing a general operation flow of the printer PRT executed in the sixth embodiment. The processing flow of FIG. 16 is executed instead of the processing of step S650 in the general operation flow of the fifth embodiment (see FIG. 12). In the sixth embodiment, the representative printer sends a delayed upload request to the represented printers in the case of successful upload of the upload file Fu to the management server SV as described below.

The CPU 10 identifies reception or no reception of a delayed upload request from another printer or the representative printer (step S650a). In the case of reception of the delayed upload request (step S650a: yes), the CPU 10 refers to the timer 30 and stores a reception time Tr of the delayed upload request into the memory 20 (step S652a).

The CPU 10 then refers to the timer 30 and determines whether the upload time has come (step S654a). When the upload time has not yet come (step S654a: no), the general operation flow returns to step S600 in the flowchart of FIG. 12. When the upload time has come (step S654a: yes), on the other hand, the CPU 10 determines whether a current time Tp is after elapse of a preset time Tc from the reception time Tr of the delayed upload request (step S656a). The preset time Tc may be determined arbitrarily. When the current time Tp is not after elapse of the preset time Tc from the reception time Tr of the delayed upload request (step S656a: no), the general operation flow returns to step S600 in the flowchart of FIG. 12. When the current time Tp is after elapse of the preset time Tc from the reception time Tr of the delayed upload request (step S656a: yes), on the other hand, the general operation flow goes to step S660 in the flowchart of FIG. 12.

In the case of no reception of the delayed upload request from the representative printer (step S650a: no), the CPU 10 refers to the timer 30 and determines whether the upload time has come (step S658a). When the upload time has not yet come (step S658a: no), the general operation flow returns to step S600 in the flowchart of FIG. 12. When the upload time has come (step S658a: yes), the general operation flow goes to step S660 in the flowchart of FIG. 12.

Figure 17:
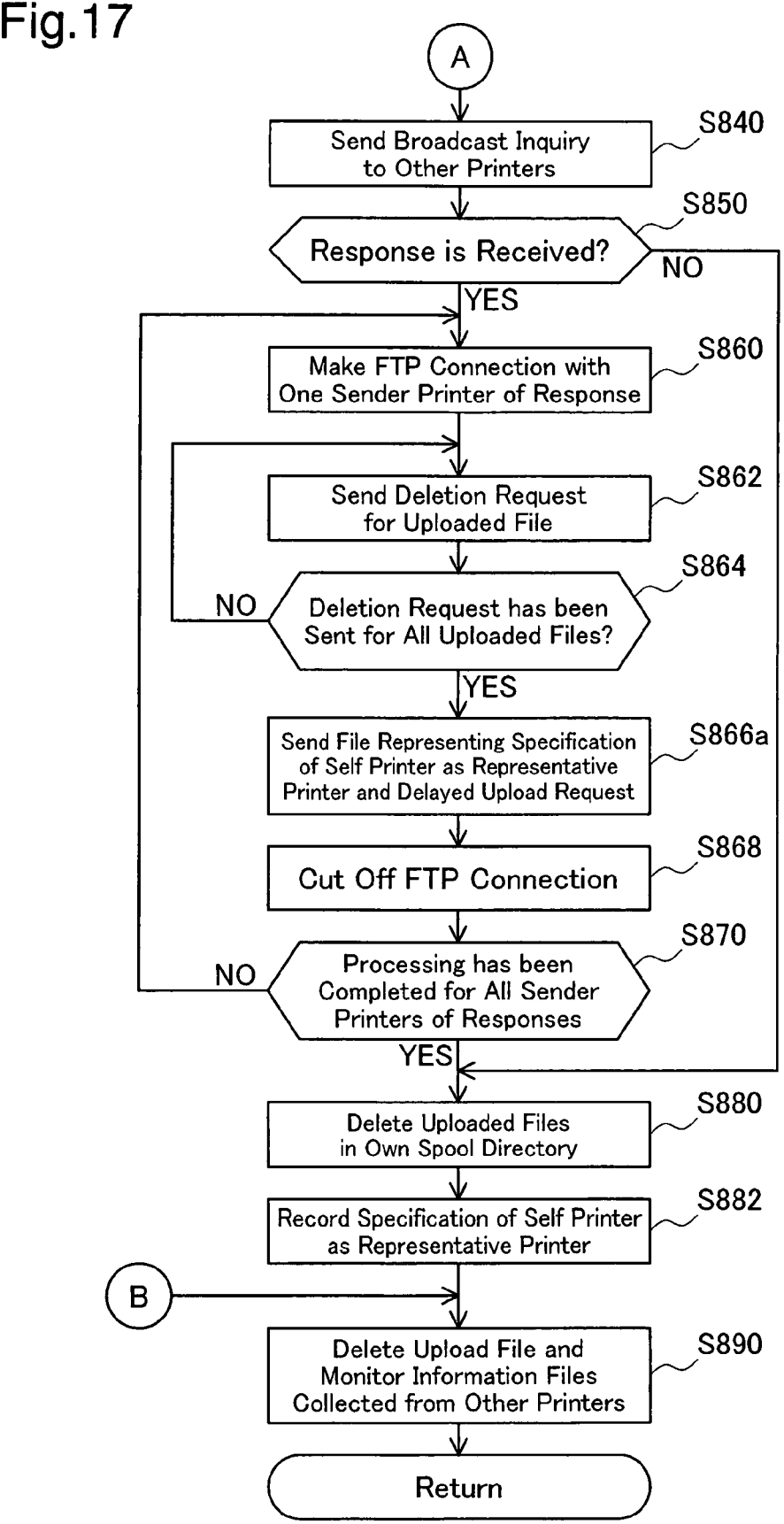
FIG. 17 is a flowchart showing the details of an upload process executed in the sixth embodiment.

FIG. 17 is a flowchart showing an upload process executed in the sixth embodiment. The upload process of the sixth embodiment includes a partly different processing flow after step S830 from the upload process of the fifth embodiment (see FIGS. 14 and 15). Specifically the upload process of the sixth embodiment executes step S866a, instead of step S866 in the flowchart of FIG. 15. Otherwise the upload process of the sixth embodiment is identical with the upload process of the fifth embodiment.

When the deletion request has been sent for all the uploaded monitor information files (step S864: yes), the CPU 10 sends a file representing identification information of the self printer specified as the representative printer and a delayed upload request to the FTP-connected printer PRT (step S866a). The file and the reception time Tr of the delayed upload request are stored into the memory 20 of the FTP-connected printer PRT. The CPU 10 then cuts off the FTP connection with the printer PRT (step S868).

In the device management system 1000 of the sixth embodiment described above, when the preset time Tc has not yet elapsed at the upload time since reception of the delayed upload request from the representative printer, even in the presence of any unsent monitor information file, which has not yet been sent to the management server SV, in the spool directory 22, the printer PRT determines that it is not the moment of collecting the monitor information files from the other printers PRT and uploading the collected monitor information files with the unsent monitor information files to the management server SV. The printer PRT accordingly does not function as the representative printer but suspends the collection of the monitor information files from the other printers PRT and the upload of the upload file to the management server SV until a next upload time. The device management system 1000 of the sixth embodiment preferably uses only one printer PRT as the representative printer to the maximum possible extent and prevents the multiple printers PRT from individually performing the upload process. This arrangement further reduces the access frequency from the respective printers PRT to the management server SV, compared with the device management system 1000 of the fifth embodiment.

G. Seventh Embodiment

A device management system 1000 of a seventh embodiment has the same configuration as that of the device management system 1000 of the fifth embodiment. Each printer PRT in the seventh embodiment has the same structure as that of the printer PRT in the fifth embodiment. The processing executed by the CPU 10 of the custom network board CNB attached to the printer PRT of the seventh embodiment is partially different from the processing executed by the printer PRT of the fifth embodiment. The following describes the difference from the fifth embodiment.

Figure 18:
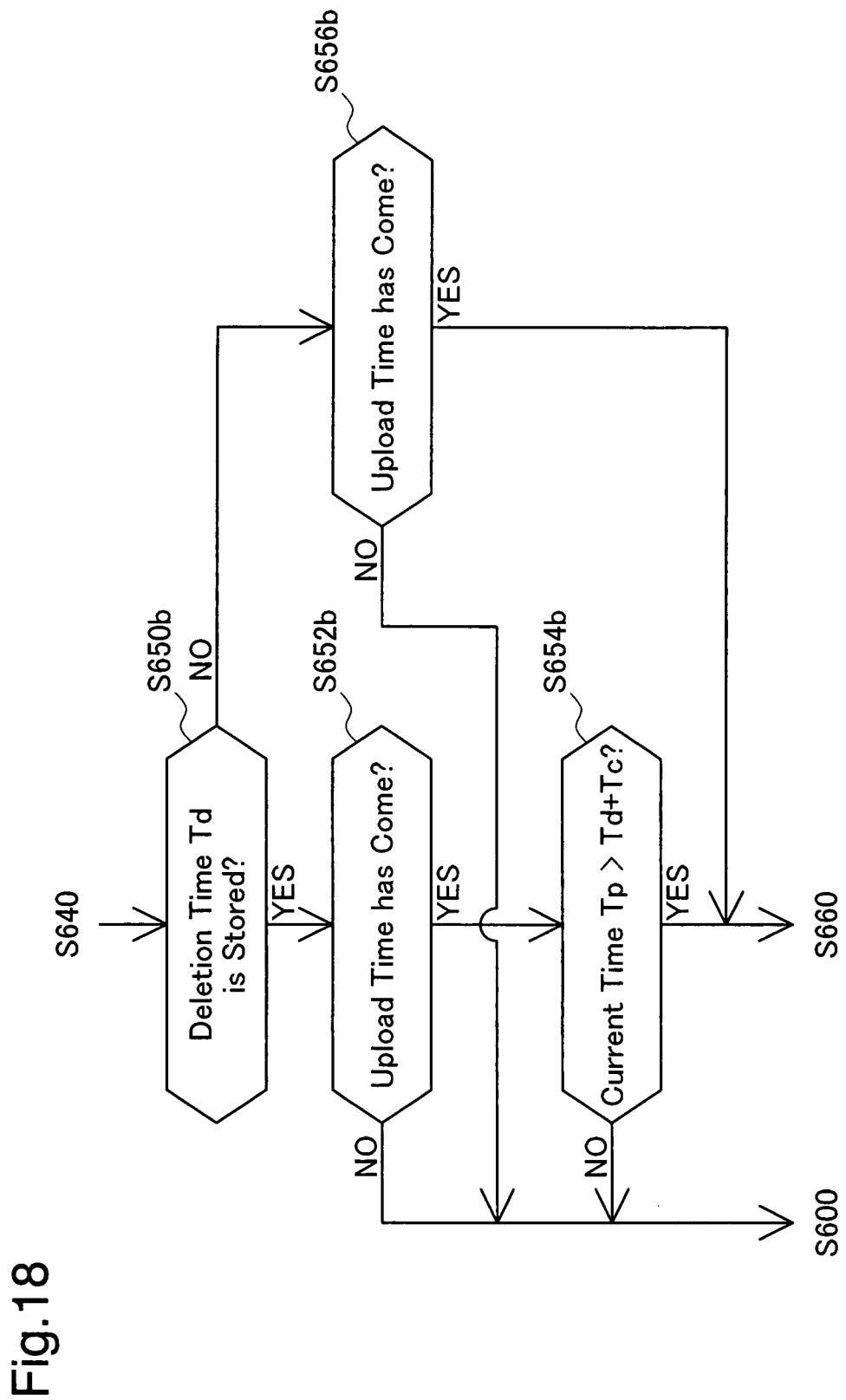
FIG. 18 is a flowchart showing a general operation flow of the printer PRT executed in a seventh embodiment of the invention.

FIG. 18 is a flowchart showing a general operation flow of the printer PRT executed in the seventh embodiment. The processing flow of FIG. 18 is executed instead of the processing of step S650 in the general operation flow of the fifth embodiment (see FIG. 12). In the seventh embodiment, each represented printer stores a deletion time Td into the memory 20 when the monitor information file is deleted in response to the received deletion request.

The CPU 10 identifies storage or non-storage of a deletion time Td in the memory 20 (step S650b). In the case of storage of the deletion time Td in the memory 20 (step S650b: yes), the CPU 10 refers to the timer 30 and determines whether the upload time has come (step S652b). When the upload time has not yet come (step S652b: no), the general operation flow returns to step S600 in the flowchart of FIG. 12. When the upload time has come (step S652b: yes), on the other hand, the CPU 10 determines whether a current time Tp is after elapse of a preset time Tc from the deletion time Td (step S654b). The preset time Tc may be determined arbitrarily. When the current time Tp is not after elapse of the preset time Tc from the deletion time Td (step S654b: no), the general operation flow returns to step S600 in the flowchart of FIG. 12. When the current time Tp is after elapse of the preset time Tc from the deletion time Td (step S654b: yes), on the other hand, the general operation flow goes to step S660 in the flowchart of FIG. 12.

In the case of non-storage of the deletion time Td in the memory (step S650b: no), the CPU 10 refers to the timer 30 and determines whether the upload time has come (step S656b). When the upload time has not yet come (step S656b: no), the general operation flow returns to step S600 in the flowchart of FIG. 12. When the upload time has come (step S656b: yes), the general operation flow goes to step S660 in the flowchart of FIG. 12.

In the device management system 1000 of the seventh embodiment described above, when the preset time Tc has not yet elapsed at the upload time since previous transmission of a monitor information file and deletion of the sent monitor information file, even in the presence of any unsent monitor information file, which has not yet been sent to the management server SV, in the spool directory 22, the printer PRT determines that it is not the moment of collecting the monitor information files from the other printers PRT and uploading the collected monitor information files with the unsent monitor information files to the management server SV. The printer PRT accordingly does not function as the representative printer but suspends the collection of the monitor information files from the other printers PRT and the upload of the upload file to the management server SV until a next upload time. This arrangement also further reduces the access frequency from the respective printers PRT to the management server SV, compared with the device management system 1000 of the fifth embodiment.

H. Eighth Embodiment

A device management system 1000 of an eighth embodiment has the same configuration as that of the device management system 1000 of the fifth embodiment. Each printer PRT in the eighth embodiment has the same structure as that of the printer PRT in the fifth embodiment. The processing executed by the CPU 10 of the custom network board CNB attached to the printer PRT of the eighth embodiment is partially different from the processing executed by the printer PRT of the fifth embodiment. The following describes the difference from the fifth embodiment.

Figure 19:
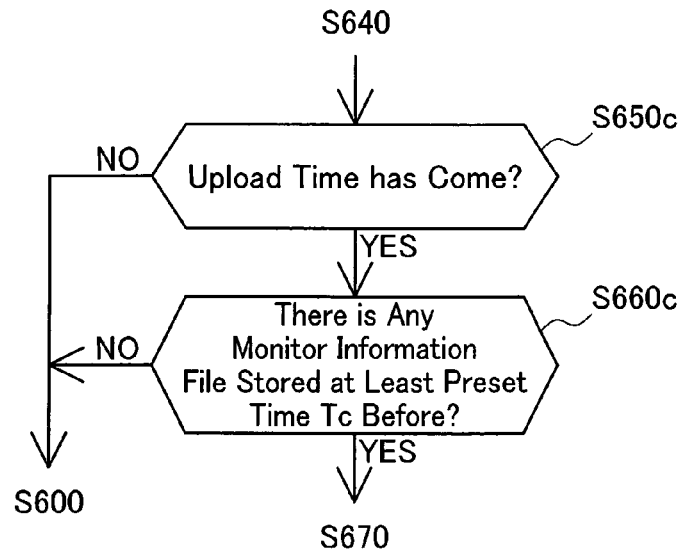
FIG. 19 is a flowchart showing a general operation flow of the printer PRT executed in an eighth embodiment of the invention.

FIG. 19 is a flowchart showing a general operation flow of the printer PRT executed in the eighth embodiment. The processing flow of FIG. 19 is executed instead of the processing of steps S650 and S660 in the general operation flow of the fifth embodiment (see FIG. 12). In the eighth embodiment, each printer PRT uses a storage time of each monitor information file stored in the spool directory 22.

The CPU 10 refers to the timer 30 and determines whether the upload time has come (step S650c). When the upload time has not yet come (step S650c: no), the general operation flow returns to step S600 in the flowchart of FIG. 12. When the upload time has come (step S650c: yes), on the other hand, the CPU 10 determines whether there is any monitor information file that was stored at least a preset time Tc before in the spool directory 22 (step S660c). The preset time Tc may be determined arbitrarily. When the spool directory 22 has no monitor information file that was stored at least the preset time Tc before (step S660c: no), it is determined that there is no monitor information file to be sent to the management server SV immediately. The printer PRT is thus not specified as the representative printer and the general operation flow goes back to step S600 in the flowchart of FIG. 12. When the spool directory 22 has any monitor information file that was stored at least the preset time Tc before (step S660c: yes), on the other hand, it is determined that the stored monitor information file is to be sent to the management server SV immediately. The general operation flow thus goes to step S670 in the flowchart of FIG. 12 to specify the printer PRT as the representative printer and perform the upload process.

In the device management system 1000 of the eighth embodiment described above, when the spool directory 22 at the upload time has no unsent monitor information file that was stored at least the preset time Tc before, irrespective of the presence of any unsent monitor information file, the printer PRT determines that it is not the moment of collecting the monitor information files from the other printers PRT and uploading the collected monitor information files with the unsent monitor information files to the management server SV. The printer PRT accordingly does not function as the representative printer but suspends the collection of the monitor information files from the other printers PRT and the upload of the upload file to the management server SV until a next upload time. In the device management system 1000 of the eighth embodiment, during the preset time after execution of the upload process by any printer PRT specified as the representative printer, no other printer PRT performs the upload process. This arrangement also reduces the access frequency from the respective printers PRT to the management server SV.

I. Modifications

The embodiments and the examples discussed above are to be considered in all aspects as illustrative and not restrictive. There may be many modifications, changes, and alterations without departing from the scope or spirit of the main characteristics of the present invention. Some examples of possible modification are given below.

I1. MODIFIED EXAMPLE 1

In the device management systems of the respective embodiments described above, each printer PRT has the timer 30. The printer PRT may alternatively have a clock or may otherwise obtain the time from an NTP server located on the Internet INT according to the requirements.

I2. MODIFIED EXAMPLE 2

In the device management systems of the respective embodiments described above, each of the multiple printers PRT has the custom network board CNB and is capable of functioning as the representative printer. It is, however, not necessary that all the printers PRT have the custom network board CNB. The requirement is that at least two printers PRT have the custom network board CNB to be capable of functioning as the representative printer. In this modified arrangement, any other printer without the custom network board CNB is not capable of functioning as the representative printer but has the functions of transferring and deleting monitor information files in response to requests from the representative printer.

I3. MODIFIED EXAMPLE 3

In the device management systems of the respective embodiments described above, each represented printer deletes the sent monitor information files in response to the deletion request from the representative printer. In one possible modification, the sent monitor information files may be deleted in answer to the reception complete response.

I4. MODIFIED EXAMPLE 4

In the device management systems of the third and the seventh embodiments described above, each printer PRT stores the deletion time Td of the monitor information file into the memory 20 and identifies the requirement or non-requirement for the upload process, based on the deletion time Td. The deletion time Td is, however, not essential for identification of the requirement for the upload process. The identification of the requirement or non-requirement for the upload process may be based on, for example, a transmission time of each monitor information file to the representative printer, a reception time of a reception complete response of each monitor information file from the representative printer, or a reception time of the deletion request from the representative printer, in place of the deletion time Td.

I5. MODIFIED EXAMPLE 5

In the device management systems of the second to the fourth embodiments and of the sixth to the eighth embodiments described above, the general operation flow of the printer PRT determines whether the spool directory 22 stores any unsent monitor information file to be uploaded to the management server SV. This decision may be omitted.

I6. MODIFIED EXAMPLE 6

In the device management systems of the first to the fourth embodiments described above, the device monitor control apparatus of the invention is applied to the printers PRT connecting with the network. This example is, however, not restrictive in any sense. The device monitor control apparatus of the invention is applicable to any of other diverse devices connecting with the network, for example, scanners, projectors, audio devices, electrical appliances, client computers, and PDAs (personal digital assistants).

I7. MODIFIED EXAMPLE 7

In the device management systems of the fifth to the eighth embodiments described above, in the general operation flow of the printer PRT shown in the flowchart of FIG. 12, no file representing the identification information of the representative printer specified in the previous upload process is recorded in the initial stage at the power-on time. In one possible modification, an activation setting process may be executed at a power-on time of the newly powered-on printer PRT.

Figure 20:
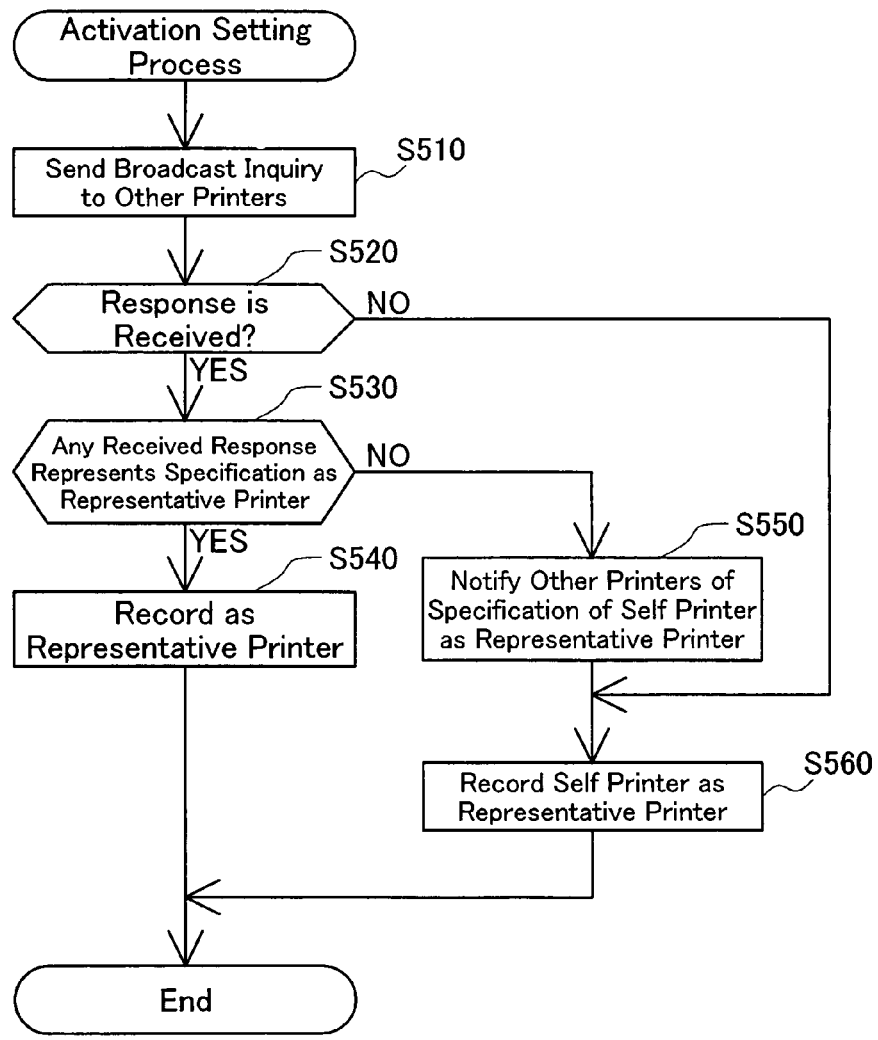
FIG. 20 is a flowchart showing an activation setting process.

FIG. 20 is a flowchart showing the activation setting process. The activation setting process is executed prior to step S600 by the CPU 10 of the custom network board CNB.

The CPU 10 first sends a broadcast inquiry about the current status as the representative printer or the represented printer to all the other printers PRT connecting with the local area network LAN (step S510). The CPU 10 then determines whether a response to the broadcast inquiry is received from any of the other printers PRT (step S520).

In the event of reception of any response to the broadcast inquiry from any of the other printers PRT (step S520: yes), the CPU 10 determines whether any of the received responses represents specification as the representative printer (step S530). When the response representing specification as the representative printer is received from any of the other printers PRT (step S530: yes), the printer PRT that has sent the response representing specification as the representative printer is recorded as the representative printer (step S540). The CPU 10 then terminates the activation setting process.

When no response representing specification as the representative printer is received from any of the other printers PRT (step S530: no), on the other hand, the CPU 10 sends a file representing the self identification information to the other printers PRT as the senders of the responses to the broadcast inquiry and accordingly notifies the other printers PRT of specification of the self printer as the representative printer (step S550). The CPU 10 records the self printer as the representative printer (step S560) and terminates the activation setting process. In the case of no reception of any response to the broadcast inquiry from any of the other printers (step S520: no), the CPU 10 records the self printer as the representative printer (step S560) and terminates the activation setting process.

At the power-on time of the newly powered-on printer PRT, the CPU 10 identifies the current representative printer PRT in this activation setting process and then executes the general operation flow shown in the flowchart of FIG. 12.

I8. MODIFIED EXAMPLE 8

In the device management systems of the fifth to the eighth embodiments described above, the upload process of FIG. 15 executes the processing of steps S840 and S850. This processing may be omitted. In this modified upload process, the CPU 10 makes FTP connection and communication with the printer PRT as one of the senders of monitor information files, instead of the senders of the responses to the broadcast inquiry at step S860 and other equivalent steps. The processing of steps S840 and S850, however, has the advantage of detecting any newly powered-on printer PRT.

I9. MODIFIED EXAMPLE 9

In the device management systems of the fifth to the eighth embodiments described above, each represented printer sends a monitor information file to the representative printer in response to the occurrence of any event. The transmission of monitor information files is not restricted to this timing. Each represented printer may send a monitor information file at any timing irrelevant to the representative printer. For example, whenever a predetermined number of unsent monitor information files are accumulated in each represented printer, the represented printer may collectively send the predetermined number of unsent monitor information files to the representative printer.

I10. MODIFIED EXAMPLE 10

In the device management systems of the fifth to the eighth embodiments described above, the device of the invention is applied to the printers PRT connecting with the network. This example is, however, not restrictive in any sense. The device of the invention is applicable to any of other diverse devices connecting with the network, for example, scanners, projectors, audio devices, electrical appliances, client computers, and PDAs (personal digital assistants).

The invention claimed is:

1. A device monitor control apparatus that is built in a first device connecting with a network and sends monitor information from the first device to a server connecting with the network, the monitor information including self-monitoring information of the first device, the device monitor control apparatus comprising:
   a monitor information storage module configured to store the monitor information;
   a monitor information collection module in communication with a second device connecting to the server, wherein the monitor information collection module collects from the second device monitor information of the second device, which is to be sent to the server and is stored in the second device, and stores the collected monitor information in the monitor information storage module;
   a first, decision module that determines at a preset time for transmitting the monitor information to the server, whether monitor information for transmission, which is to be sent to the server, is stored in the monitor information storage module;
   a second decision module that issues a required-state for collecting monitor information when monitor information is stored in the monitor information storage, module for at least a predetermined time, and issues a not-required-state for not collecting monitor information when monitor information is not stored in the monitor information storage module for at least the predetermined time;
   a transmission module that sends the collected monitor information of the second device and the self-monitoring information of the first device stored in the monitor information storage module to the server when the first decision module determines that the monitor information for transmission is stored in the monitor information storage module, and does not send any monitor information to the server when the first decision module determines that any monitor information for transmission is not stored in the monitor information storage module;
   a reception complete response receiving module that receives a reception complete response which represents completed reception of the monitor information, from the server; and
   a monitor information deletion module that deletes from the monitor information storage module sent monitor information which has been sent to the server, in answer to the reception complete response;
   wherein the transmission module sends to the second device a deletion request for deletion of the collected monitor information of the second device in answer to the reception complete response;
   wherein the first device and the second device are devices that execute an output process based on an instruction from a client computer; and
   wherein the monitor information is sent to the server from the first device or the second device via the network without the client computer.

2. The device monitor control apparatus in accordance with claim 1, further including:
   an event occurrence detection module that detects occurrence of a specific event in the first device;
   wherein in response to detection of the occurrence of the specific event in the first device by the event occurrence detection module, the monitor information collection module performs the collection of the monitor information for transmission from the second device.

3. The device monitor control apparatus in accordance with claim 1, further including:
   an identification information storage module that stores first identification information for identifying the first device,
   wherein the monitor information collection module collects second identification information for identifying the second device from the second device, and
   the transmission module sends the collected monitor information of the second device in correlation to the second identification information and the self-monitoring information of the first device in correlation to the first identification information.

4. The device monitor control apparatus in accordance with claim 1, further including:
   a monitor information file creation module that creates a monitor information file that integrally records the collected monitor information of the second device and the self-monitoring information of the first device,
   wherein the transmission module sends the created monitor information file to the server.

5. The device monitor control apparatus in accordance with claim 1, further including:
   a transmission request receiving module that receives a transmission request from the second device,
   wherein in response to receiving the transmission request, the transmission module sends the monitor information of the first device to the second device.

6. The device monitor control apparatus in accordance with claim 5, wherein:
   the reception complete response receiving module receives a second reception complete response from the second device; and
   the monitor information deletion module deletes sent monitor information, which has been sent to the second device and is stored in the monitor information storage module, in answer to the second reception complete response.

7. The device monitor control apparatus in accordance with claim 5, including:
   a deletion request receiving module that receives a second deletion request from the second device for deletion of sent monitor information that has been sent to the second device;
   wherein the monitor information deletion module deletes the sent monitor information that has been sent to the second device and is stored in the monitor information storage module, in response to reception of the second deletion request.

8. A device monitor control apparatus that is built in a device connecting with a network and sends monitor information regarding the device to a server connecting with the network, the device monitor control apparatus comprising:
- a monitor information storage module that stores the monitor information;
- a monitor information collection module that sends a transmission request to another device connecting with the network for sending monitor information for transmission, which is to be sent to the server and is stored in the another device, and collects the monitor information for transmission from the another device as a response to the transmission request;
- a transmission module that sends the collected monitor information for transmission and the monitor information for transmission stored in the monitor information storage module to the server; and
- a decision module that identifies requirement or non-requirement for the collection of the monitor information, based on a predetermined condition at a preset timing which is preset each device individually, prior to the collection of the monitor information,
- wherein upon identification of the non-requirement for the collection of the monitor information by the decision module, the monitor information collection module suspends the collection of the monitor information at least to a next preset timing,
- the device further comprising: a delayed collection request receiving module that receives a delayed collection request from the another device for suspending the collection of the monitor information,
- wherein the predetermined condition includes a condition that a preset time has elapsed since the reception of the delayed collection request, and the decision module identifies the non-requirement for the collection of the monitor information when the preset time has not elapsed since the reception of the delayed collection request,
- wherein the monitor information stored in the monitor information storage module is related to timing information stored in the monitor information storage module, the timing information representing a storage timing of the monitor information stored in the monitor information storage module,
- wherein the predetermined condition further includes a condition that the monitor information to be sent to the server is stored in the monitor information storage module at least a predetermined time before, and
- wherein the decision module refers to the timing information and identifies the non-requirement for the collection of the monitor information when there is no monitor information stored in the monitor information storage module at least the predetermined time before,
- wherein the device and the another device are devices that execute an output process based on an instruction from a client computer, and
- wherein the monitor information is sent to the server from the device or the another device via the network without the client computer.

9. The device monitor control apparatus in accordance with claim 8, wherein upon identification of the non-requirement for the collection of the monitor information by the decision module, the transmission module suspends the transmission of the monitor information for transmission stored in the monitor information storage module to the server at least to the next preset timing.

10. The device monitor control apparatus in accordance with claim 8, the device monitor control apparatus further including:
- a transmission request receiving module that receives the transmission request from the another device,
- wherein the transmission module receives the transmission request from the another device and, in response to the received transmission request, sends back the monitor information stored in the monitor information storage module to the another device that has sent the transmission request,
- the predetermined condition includes a condition that a preset time has elapsed since the transmission of the monitor information, and
- the decision module identifies the non-requirement for the collection of the monitor information, when the preset time has not elapsed since the transmission of the monitor information.

11. The device monitor control apparatus in accordance with claim 10, the device monitor control apparatus further including:
- a reception complete response receiving module that receives a reception complete response, which represents completed reception of the monitor information, from either the server or the another device,
- wherein the predetermined condition includes a condition that a preset time has elapsed since the reception of the reception complete response, and
- the decision module identifies the non-requirement for the collection of the monitor information, when the preset time has not elapsed since the reception of the reception complete response.

12. The device monitor control apparatus in accordance with claim 10, the device monitor control apparatus further including:
- a deletion request receiving module that receives a deletion request from either the server or the another device for deletion of sent monitor information stored in the monitor information storage module; and
- a monitor information deletion module that deletes the sent monitor information, in response to the received deletion request,
- wherein the predetermined condition includes a condition that a preset time has elapsed since the deletion of the sent monitor information, and
- the decision module identifies the non-requirement for the collection of the monitor information, when the preset time has not elapsed since the deletion of the sent monitor information.

13. The device monitor control apparatus in accordance with claim 8,
- wherein the predetermined condition includes a condition that the monitor information storage module has any monitor information for transmission, and
- the decision module identifies the non-requirement for the collection of the monitor information, when the monitor information storage module has no monitor information for transmission.

14. A device connecting with a network, the device having the device monitor control apparatus in accordance with claim 1.

15. A control method of a device monitor control apparatus that is built in a first device connected to a network and sends monitor information from the first device to a server connected to the network, the monitor information including self-monitoring information of the first device, the control method comprising:
- (a) storing the monitor information into a monitor information storage module;

(b) determining at a preset time for transmitting the monitor information to the server, whether monitor information for transmission, which is to be sent to the server, is stored in the monitor information storage module;

(c1) when the self-monitoring information is stored to the monitor information storage module, collecting, from a second device connected to the network, second monitor information which is to be sent to the server and is stored in the second device, in advance of sending the monitor information stored in the monitor information storage module to the server;

(c2) issuing a required-state for collecting monitor information when monitor information is stored in the monitor information storage module for at least a predetermined time, and issuing a not-required-state for not collecting monitor information when monitor information is not stored in the monitor information storage module for at least the predetermined time;

(d) sending the collected second monitor information and the self-monitoring monitor information to the server when it is determined that the monitor information for transmission is stored in the monitor information storage module, and not sending any monitor information to the server when it is determined that any monitor information for transmission is not stored in the monitor information storage module;

(e) receiving a reception complete response which represents completed reception of the monitor information, from the server; and (f) in answer to reception of the reception complete response, deleting from the monitor information storage module sent monitor information which has been sent to the server, and sending to the second device a deletion request for deletion of the collected second monitor information;

wherein the first device and the second device are devices that execute an output process based on an instruction from a client computer, and wherein the monitor information is sent to the server from the first device or the second device via the network without the client computer.

16. A control method of a device monitor control apparatus that is built in a device connected to a network and sends monitor information from the first device to a server connected to the network, the monitor information including first self-monitoring information of the first device, the control method comprising:

(a1) storing the monitor information into a monitor information storage module;

(a2) providing a plurality of second devices connected to the network, each second device being configured to generate second self-monitoring information of itself;

(b) sending a transmission request to at least one of said second devices for its corresponding second self-monitoring information, which is to be sent to the server, and collecting the second self-monitoring information from at least one of said second devices as a response to the transmission request;

(c) sending the collected second self-monitoring information and the first self-monitoring information stored in the monitor information storage module to the server; and (d) issuing a required state or not-required state for the collection of the second self-monitoring information, based on a predetermined condition at a preset timing which is preset for each of said second devices individually, prior to the collection of the second self-monitoring information in step (b);

wherein step (b) includes suspending the collection of the second self-monitoring information at least to a next preset timing when the not-required state is identified in step (d);

(e) receiving a delayed collection request from one of said second devices for suspending the collection of the second self-monitoring information;

wherein the predetermined condition of step (d) includes a condition that an assigned time has elapsed since the reception of the delayed collection request, and the not-required state is issued in the step (d) while the assigned time has not elapsed since the reception of the delayed collection request;

wherein the monitor information stored in the monitor information storage module is related to timing information stored in the monitor information storage module, the timing information representing a storage timing of the monitor information stored in the monitor information storage module, wherein the predetermined condition further includes a condition that the monitor information to be sent to the server is stored in the monitor information storage module at least a predetermined time before, and wherein the step (b) includes referring to the timing information and issuing the not-required state while there is no monitor information stored in the monitor information storage module at least the predetermined time before, wherein the first device and said one of said second devices are devices that execute an output process based on an instruction from a client computer, and wherein the monitor information is sent to the server from the first device or from said one of said second devices via the network without the client computer.

17. A device management system including multiple devices and a management server for management of the multiple devices, which are mutually connected via a network;

a first device among the multiple devices becoming a representative device based on a predetermined condition, said representative device sending a notification to a second device among said multiple devices to notify it that the representative device collectively sends monitor information of the multiple devices to the management server;

the second device receiving the notification and successively sending its monitor information to the representative device at a preset timing irrelevant to the representative device;

the representative device repeatedly sending monitor information of the representative device and the collected monitor information of the second device to the management server at a specified timing;

the second device checking whether an event occurred in the second device that is a critical event that requires an urgent notification to the management servers;

the second device making itself the representative device without sending its monitor information to any of the multiple devices, and sending its monitor information including the occurrence of the critical event to the management server when the event is the critical event;

wherein a device operating as the representative device among the multiple devices records its identification information in each of the multiple devices;

wherein a latest one device among the multiple devices continuously operates as the representative device in accordance with the identification information recorded in each of the multiple devices;

wherein the monitor information stored on the representative device is related to timing information stored on the representative device, the timing information representing a storage timing of the monitor information stored on the representative device;

wherein the predetermined condition includes a condition that the monitor information o be sent to the management server is stored on the representative device for at least a predetermined time;

wherein the representative device refers to the timing information and issue a not required state for not sending the notification when there is no monitor information stored on the representing device for at least the predetermined time;

wherein the plurality of devices are devices that execute an output process based on an instruction from a client computer; and wherein the monitor information is sent to the server from the any of the multiple devices via the network without the client computer.

18. The device management system in accordance with claim 17, wherein the preset timing is based on occurrence of an event in the second device.

19. The device management system in accordance with claim 17, wherein the multiple devices have corresponding identification information;

the second device sends its monitor information in correlation to its identification information to the representative device, and the representative device sends each of the collected monitor information in correlation with the identification information of its corresponding device to the management server.

20. The device management system in accordance with claim 17, wherein after transmission of the monitor information to the management server, the representative device sends a deletion request to the second device for deleting its sent monitor information, and the second device receives the deletion request from the representative device and deletes its sent monitor information in response to reception of the deletion request.

21. A control method of a device management system that includes multiple devices and a management server for management of the multiple devices, which are mutually connected via a network, the control method comprising:

causing, based on a predetermined condition, a specific device among the multiple devices to send a notification to another device other than the specific device, in order to notify that the specific device collectively sends monitor information with regard to the multiple devices to the management server;

causing the another device to receive the notification and to successively send monitor information with regard to the another device to the specific device at a preset timing irrelevant to the specific device;

causing the specific device to repeatedly send monitor information with regard to the specific device and the monitor information with regard to the another device received from the another device to the management server at a specified timing;

causing the another device to check whether an event occurred in the another device is a critical event which requires an urgent notification to the management server; and causing the another device to make the another device as a specific device without sending the monitor information with regard to the another device to any of the multiple devices, and to send monitor information with regard to occurrence of the critical event to the management server when the event is the critical event;

wherein the monitor information stored on the specific device is related to timing information stored on the specific device, the timing information representing a storage timing of the monitor information stored on the specific device;

wherein the predetermined condition includes a condition that the monitor information to be sent to the management server is stored on the specific device at least a predetermined time before; and wherein the specific device refers to the timing information and identifies non-requirement for sending the notification when there is no monitor information stored on the specific device at least the predetermined time before;

wherein the specific device and the another device are devices that execute an output process based on an instruction from a client computer, and wherein the monitor information is sent to the server from the specific device or the another device via the network without the client computer.

* * * * *